United States Patent
Watanabe et al.

(10) Patent No.: US 7,550,546 B2
(45) Date of Patent: Jun. 23, 2009

(54) NORBORNENE-BASED POLYMERS, FILMS, POLARIZING PLATES AND LIQUID CRYSTAL DISPLAY DEVICES

(75) Inventors: Saisuke Watanabe, Minami-ashigara (JP); Yutaka Nozoe, Minami-ashigara (JP); Seiya Sakurai, Minami-ashigara (JP); Kiyoshi Takeuchi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/828,479

(22) Filed: Jul. 26, 2007

(65) Prior Publication Data
US 2008/0033133 A1    Feb. 7, 2008

(30) Foreign Application Priority Data
Jul. 28, 2006   (JP) ............... 2006-207151
Jul. 28, 2006   (JP) ............... 2006-207152

(51) Int. Cl.
*C08F 32/00* (2006.01)
*C09K 19/38* (2006.01)
*C07C 13/24* (2006.01)

(52) U.S. Cl. .................. 526/281; 526/256; 526/259; 428/1.3; 349/117

(58) Field of Classification Search .......... 526/281, 526/256, 259; 428/1.3; 349/117
See application file for complete search history.

(56) References Cited

U.S. PATENT DOCUMENTS

| | | | | |
|---|---|---|---|---|
| 5,559,199 A * | 9/1996 | Abe et al. | ......... | 526/160 |
| 6,429,272 B1 * | 8/2002 | Liu | ......... | 526/281 |
| 2005/0182220 A1 * | 8/2005 | Liaw et al. | ......... | 526/282 |

FOREIGN PATENT DOCUMENTS

| | | | |
|---|---|---|---|
| WO | 2004/007587 A1 | 1/2004 | |
| WO | 2004/049011 A2 | 6/2004 | |

\* cited by examiner

*Primary Examiner*—Fred M Teskin
(74) *Attorney, Agent, or Firm*—Buchanan Ingersoll & Rooney PC

(57) ABSTRACT

A norbornene-based polymer contains at least one kind of a repeating unit represented by the following formula (I):

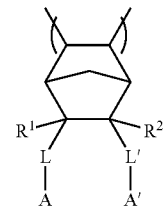

wherein $R^1$ and $R^2$ each represent a hydrogen atom, an alkyl group which may possess a substituent group or an aryl group which may possess a substituent group, L and L' each represent a bivalent linking group or a single bond, and A and A' each represent an aromatic group.

27 Claims, No Drawings

NORBORNENE-BASED POLYMERS, FILMS, POLARIZING PLATES AND LIQUID CRYSTAL DISPLAY DEVICES

FIELD OF THE INVENTION

The present invention relates to norbornene-based polymers, films (particularly, various kinds of functional films such as retardation films, viewing angle-widening films and antireflection films to be used in plasma displays, polarization plate-protective films, etc.), polarizing plates and liquid crystal display devices using such norbornene-based polymers.

DESCRIPTION OF THE RELATED ART

Since a film of a norbornene-based polymer obtained by a vinyl polymerization of a norbornene-based compound (hereinafter referred to as "norbornene-based polymer") is feature by a high retardation value in a thickness direction (Rth), it is applicable to a negative C-plate (WO/2004/049011). Further, when the film is stretched, main chains of the norbornene-based polymer are oriented in the stretched direction, and retardation (Re) is exhibited. Thus, the film can be used for biaxial retardation plates. That is, the films of the norbornene-based polymer are promising as the retardation films having high Re and Rth values. Such films can take values preferable as the retardation films of the liquid crystal display devices of a VA (vertical alignment) system.

On the other hand, retardation films in recent liquid crystal display devices are required to have not only specific Re and Rth values for a certain wavelength but also a characteristic that the Re and Rth values continuously vary over wavelengths in a visible light region, i.e. 400 nm to 700 nm (wavelength dispersion). For example, the retardation film of the liquid crystal display device of the vertical alignment (VA) system is required to have a reverse wavelength dispersion characteristic that the longer the wavelength is, the greater the Re value is. For example, if Re values at wavelengths of 450 nm, 590 nm and 630 nm are taken as Re450, Re590 and Re630, respectively, it is required that Re450≦Re590≦Re630. In general, although introduction of a component having a long absorption wavelength is effective to change a wavelength dispersion characteristic, up to now, only WO/2004/007587 describes a polymer into which a phenyl groups are introduced.

BRIEF DESCRIPTION OF THE INVENTION

Present inventors' investigation revealed that the wavelength dispersion characteristic was improved in a film of the above norbornene-based polymer containing the phenyl groups, the improved degree was small and was not sufficient to enhance a color in the liquid crystal display device. Therefore, films of norbornene-based polymers which can afford greater wavelength-dispersing degrees are desired.

Having made keen investigations to solve the above problems, the present inventors discovered that a film of a norbornene-based polymer which contains a norbornene unit having two aromatic groups exhibits reverse dispersion for the wavelength dispersion characteristic of Re and its degree is increased. Further, the inventors discovered that the above dispersion characteristic becomes particularly greater in case of an aromatic compound in which one hydrogen atom is removed, an aromatic group has a local maximum absorption wavelength of 270 to 400 nm and a molar absorption coefficient at that local maximum absorption wavelength is 10 to 100000 [mol$^{-1}$dm$^3$cm$^{-1}$]. Consequently, the inventors have reached the present invention. It was discovered that a high-quality polarizing plate and a high-quality liquid crystal display device can be each obtained by incorporating a film of the norbornene-based polymer of the present invention.

The present inventors thought that it is also effective to introduce an aromatic compound having a long absorption wavelength in the object of the present invention. Surprisingly, it was found that when an aromatic compound from which a hydrogen atom is removed having a local maximum absorption wavelength in 300 nm to 400 nm and a molar absorption coefficient of 10 to 100,000 mol$^{-1}$dm$^3$cm$^{-1}$ at the local maximum absorption wavelength is introduced to a norbornene-based polymer, a wavelength dispersion characteristic of the obtained film refractive index is remarkably improved. It was also found that the stereochemistry of the aromatic compound from which a hydrogen atom is removed decides positive and negative of the wavelength dispersion characteristic (a normal wavelength dispersion or a reverse wavelength dispersion). That is, it was found that a reverse wavelength dispersion of a refractive index was achieved by exo-bonding the aromatic compound component to norbornene unit.

The measures to solve the above problems are as follows.

(1) A norbornene-based polymer characterized by containing at least one kind of a repeating unit represented by the following formula (I):

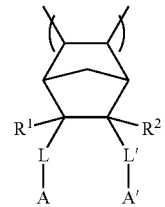

wherein R$^1$ and R$^2$ each represent a hydrogen atom, an alkyl group which may possess a substituent group or an aryl group which may possess a substituent group, L and L' each represent a bivalent linking group or a single bond, and A and A' each represent an aromatic group.

(2) The norbornene-based polymer according to (1), wherein the L and the L' each represent a single bond, a carbonyl group or an acetylene group.

(3) The norbornene-based polymer according to (1) or (2), wherein the A and/or the A' is an aromatic compound from which one hydrogen atom is removed, the one hydrogen atom-removed aromatic compound having a local maximum absorption wavelength in 270 nm to 400 nm and a molar absorption coefficient of 10 to 100,000 [mol$^-$₁dm$^3$cm$^{-1}$] at the local maximum absorption wavelength.

(4) The norbornene-based polymer according to any one of (1) to (3), wherein the A and/or the A' is 2-ring to 4-ring fused aromatic compounds from which one hydrogen atom is removed.

(5) The norbornene-based polymer according to any one of (1) to (4), wherein each of the L-A and the L'-A' is of an exo bond.

(6) The norbornene-based polymer according to any one of (1) to (5), which further comprises at least one kind of a repeating unit represented by the following formula (II):

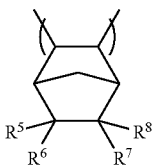

wherein $R^5$, $R^6$, $R^7$ and $R^8$ each represent a hydrogen atom, an alkyl group which may possess a substituent group, an aryl group which may possess a substituent group or -L"-O—CO—$R^9$ in which L" is a bivalent linking group or a single bond and $R^9$ is an alkyl group, and at least one of $R^5$, $R^6$, $R^7$ and $R^8$ is -L"-O—CO—$R^9$.

(7) The norbornene-based polymer according to (6), wherein three of the $R^5$, the $R^6$, the $R^7$ and the $R^8$ each represent a hydrogen atom or an alkyl group which may have a substituent group.

(8) The norbornene-based polymer according to (6) or (7), wherein the L" is a single bond or an alkylene group.

(9) The norbornene-based polymer according to any one of (6) to (8), wherein the $R^9$ is an alkyl group having 1 to 5 carbon atoms.

(10) The norbornene-based polymer according to any one of (6) to (9), which consists only of the repeating unit represented by the formula (I) and the repeating unit represented by the formula (II).

(11) The norbornene-based polymer according to any one of (1) to (10), wherein a polymerization compounding ratio of the repeating unit represented by the formula (I) is more than 0% and less than 80%.

(12) A norbornene-based polymer characterized by containing at least one kind of a repeating unit derived from a norbornene-based compound having at least one kind of a substituent group containing an aromatic compound from which a hydrogen atom is removed, wherein the aromatic compound from which a hydrogen atom is removed has a local maximum absorption wavelength in 300 nm to 400 nm and a molar absorption coefficient of 10 to 100,000 $mol^{-1}dm^3cm^{-1}$ at the local maximum absorption wavelength.

(13) The norbornene-based polymer according to (12), wherein the repeating unit derived from a norbornene-based compound is represented by the following formula (I-I):

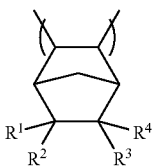

wherein $R^1$, $R^2$, $R^3$ and $R^4$ each represent a hydrogen atom, an alkyl group which may possess a substituent group, an aryl group which may possess a substituent group or a substituent group containing an aromatic compound from which a hydrogen atom is removed, having a local maximum absorption wavelength in 300 nm to 400 nm and a molar absorption coefficient of 10 to 100,000 $mol^{-1}dm^3cm^{-1}$ at the local maximum absorption wavelength, and at least one of the $R^1$, the $R^2$, the $R^3$ and the $R^4$ is the above substituent group containing the compound from which a hydrogen atom is removed.

(14) The norbornene-based polymer according to (13), wherein among the $R^1$, the $R^2$, the $R^3$ and the $R^4$, a substituent group other than the substituent group containing the compound from which a hydrogen atom is removed each represent a hydrogen atom or an alkyl group.

(15) The norbornene-based polymer according to (13) or (14), wherein one or two of the $R^1$, the $R^2$, the $R^3$ and the $R^4$ represent the substituent group containing the compound from which a hydrogen atom is removed.

(16) The norbornene-based polymer according to any one of (12) to (15), wherein the compound from which a hydrogen atom is removed is bonded to the norbornene-based compound through an exo-bond.

(17) The norbornene-based polymer according to any one of (12) to (16), wherein the aromatic compound having a local maximum absorption wavelength in 300 nm to 400 nm and a molar absorption coefficient of 10 to 100,000 $mol^{-1}dm^3cm^{-1}$ at the local maximum absorption wavelength is a 2-ring to 4-ring fused aromatic compound.

(18) The norbornene-based polymer according to any one of (12) to (17), which further comprises at least one kind of a repeating unit represented by the following formula (II):

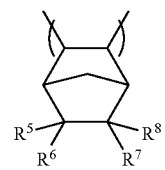

wherein $R^5$, $R^6$, $R^7$ and $R^8$ each represent a hydrogen atom, an alkyl group which may possess a substituent group, an aryl group which may possess a substituent group or -L"-O—CO—$R^9$ in which L" is a bivalent linking group or a single bond and $R^9$ is an alkyl group, and at least one of the $R^5$, the $R^6$, the $R^7$ and the $R^8$ is -L"-O—CO—$R^9$.

(19) The norbornene-based polymer according to (18), wherein the L" is a single bond or an alkylene group having 1 to 10 carbon atoms, and $R^9$ is an alkyl group having 1 to 10 carbon atoms.

(20) The norbornene-based polymer according to (18) or (19), wherein $R^9$ is an alkyl group having 1 to 5 carbon atoms.

(21) The norbornene-based polymer according to any one of (13) to (20), wherein a polymerization compounding ratio of the repeating unit represented by the formula (I-I) is 3% to 50%.

(22) The norbornene-based polymer according to any one of (18) to (21), which consists only of the repeating unit represented by the formula (I-I) and the repeating unit represented by the formula (II).

(23) A film comprising the norbornene-based polymer according to any one of (1) to (22).

(24) The film according to (23), which satisfies 10 nm≦ΔRe≦100 nm, a difference ΔRe=Re630−Re450 in which Re450 and Re630 are in-plane retardation values at wavelengths 450 nm and 630 nm, respectively.

(25) The film according to (23) or (24), wherein an in-plane retardation value Re590 satisfies 30 nm≦Re590≦200 nm in which Re590 is a in-plane retardation value at a wavelength of 590 nm.

(26) A polarizing plate comprising a polarizing film and the film according to any one of (23) to (25).

(27) A liquid crystal display device comprising the polarizing plate according to any one of (26).

DESCRIPTION OF SPECIFIC EMBODIMENTS

In the following, examples of the present invention will be explained in detail. In the present specification, In the present specification, "... to ..." is used to mean that figures recited before and after "to" are included as a lower limit and an upper limit.

[Norbornene-Based Polymer (1)]

The norborene-based polymer is a homopolymer which is an addition polymer of one kind of a norborene-based compound or a copolymer which is an addition polymer of two or more norborene-based compounds.

The norbornene-based polymer of the present invention is characterized by containing a repeating unit represented by the following formula (1). The norbornene-based polymers in the present invention include homopolymers and copolymers in which norbornene-based compounds are polymerized. The repeating unit represented by the following formula (I) may be of one kind or plural kinds, and other repeating units may be contained as mentioned later.

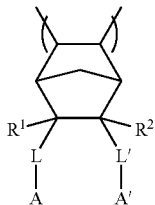

In the formula (I), $R^1$ and $R^2$ each represent a hydrogen atom, an alkyl group which may possess a substituent group or an aryl group which may possess a substituent group. The substituent group is not particularly limited. Each of $R^1$ and $R^2$ is preferably a hydrogen atom or an alkyl group, and more preferably a hydrogen atom.

In the formula (I), L and L' each represent a bivalent linking group or a single bond, and may be identical or different. As the bivalent linking group, mention may be made of an alkylene group (preferably 1 to 10 carbon atoms, more preferably 1 to 5 carbon atoms, particularly preferably 1 to 3 carbon atoms: for example, a methylene group (—$CH_2$—), an ethylene group (—$CH_2CH_2$—), a trimethylene group (—$CH_2CH_2CH_2$—), etc. may be recited), an arylene group (preferably 6 to 30 carbon atoms, more preferably 6 to 20 carbon atoms, particularly preferably 6 to 12 carbon atoms: for example, a phenylene group (—$C_6H_4$—), a naphthylene group (—$C_{10}H_6$—), etc. may be recited), an oxyalkylene group (preferably 1 to 20 carbon atoms, more preferably 1 to 12 carbon atoms, particularly preferably 1 to 8 carbon atoms: for example, an oxymethylene group (—$OCH_2$—), an oxyethylene group (—$OCH_2CH_2$—), etc. may be recited), an oxyarylene group (preferably 6 to 20 carbon atoms, more preferably 6 to 16 carbon atoms, particularly preferably 6 to 12: for example, oxyphenylene group (—$OC_6H_4$—), an oxynaphthalene group (—$OC_{10}H_6$—) may be recited), an oxycarbonyl group (—OCO—), an iminocarbonyl group (—CONH—), a carbonyl group (—CO—), an acetylene group (—CC—), an urethane group (—NHCONH—), hetero atoms such as a sulfur atom, an oxygen atom, an amino group (—NRa—: Ra represents a substituent group), etc. Two or more of these linking groups may be combined. Further, these linking groups may be substituted with a substituent group or substituent groups.

The shorter the side chain is, the smaller the optical elasticity is, which is preferable for the film. Therefore, as L and L', a single bond or a linking group having not more than 3 atoms is preferable, a single bond, a carbonyl group or an acetylene group is more preferable, and a single bond is further preferable.

When L-A and L'-A' have the same steric structure, they give a higher stacking effect between aromatic groups. Thus, exo-exo or endo-endo is preferable, and the exo-exo is more preferable.

A and A' each represent an aromatic group. For example, an aromatic group from which one hydrogen is removed is recited. As the aromatic group from which one hydrogen atom is removed, mention may be made of monocyclic or condensed hydrocarbons such as benzene, pentalene, naphthalene, azulene, heptalene, biphenylene, indacene, acenaphthylene, phenanthrene, anthracene, luoranthene, acephenanthrene, triphenylene, pyrene, chrysene, naphthacene, plyaden, picene, perylene, pentaphene, pentacene, tetraphenylene, hexaphene, hexacene, rubicene, coronene, trinaphthylene, heptaphene, pephthacene, pyracene, obalene, etc.; heterocyclic compounds such as thiophene, thianthrene, furan, pyran, isobenzofuran, chromene, cusancene, phenokusancene, pyrrole, imidazole, pyrazole, isothiazole, isoxazole, pyridine, pyrazine, pyrimidine, pyridazine, indolizine, isoindole, indole, indazole, purine, xylidine, isoquinone, quinoline, phthalazine, naphthyridine, quinoxaline, cinoline, pteridine, carbazole, beta-carboline, phenanthridine, acridine, perimidine, phenanthroine, phenazine, phenarsazine, phenothiazine, furazan, phenoxazine, etc. Those compounds may have a substituent group or substituent groups.

Furthermore, A and A' are preferably aromatic compounds having one hydrogen atom removed therefrom, in which preferably at least one of, more preferably both of A and A' have local maximum absorption wavelengths in 270 to 400 nm, and molar absorption coefficients at the local maximum absorption wavelengths are 10 to 100000 $[mol^{-1}dm^3cm^{-1}]$. Aromatic compounds having one hydrogen atom removed therefrom are more preferable, which aromatic compounds have local maximum absorption wavelengths of 300 to 400 nm. When an aromatic compound from which one hydrocarbon is removed and which has an absorption wavelength of 270 nm or more is used, an effect upon the wavelength dispersion characteristic is high, whereas when the absorption wavelength is not more than 400 nm, the film is preferably less likely to become yellowish.

In the present specification, the local maximum absorption wavelength means a local maximum point of absorption peaks obtained by measuring absorption wavelengths at 25° C. by an ordinary UV measurement instrument in the state that a molar absorption coefficient of 10 to 100,000 $[mol^{-1}dm^3cm^{-1}]$ at the local maximum absorption wavelength is dissolved at an appropriate concentration in methylene chloride (if not dissolved, dissolved in hexane or heptane). Although the unit of the molar absorption coefficient is $[mol^{-1}dm^3cm^{-1}]$, the unit thereof is not limited to it, unless specified otherwise below. The local maximum absorption wavelength is not necessarily the maximum absorption wavelength. There may be plural local maximum points.

The molar absorption coefficient at the local maximum absorption wavelength in the case of the aromatic compound which has the local maximum absorption wavelength in 270 nm to 400 nm is preferably 100 to 100,000, more preferably 120 to 100,000, and further preferably 130 to 100,000.

Moreover, A and A' are preferably 2-ring to 4-ring fused aromatic compounds having one hydrogen atom removed therefrom, among aromatic groups, and naphthalene, anthracene, phenanthrene and pyrene from which one hydrogen atom is removed are further preferable.

The norbornene-based polymer according to the present invention may contain other repeating units in such an amount that negates the purpose of the present invention. When the polymer contains other repeating units, the polymerization compounding ratio of the repeating units represented by the formula (I) is preferably more than 0% and less than 80%, more preferably more than 0% and less than 60%, and further preferably 5% to 40%.

Particularly, the norbornene-based polymer of the present invention preferably consists only of the repeating unit represented by the formula (I) and the ones represented by the below-mentioned formula (II). "Consists only of" in this case includes a case in which no component other than the repeating unit represented by the formula (I) and the one represented by the formula (II) is contained at all or a case in which other component may be contained in such an amount as not negating the purpose of the present invention. For example, the polymer may contain reaction residues such as the monomers constituting these repeating units, additives and the like usually used for polymerization, etc.

When the above compounding ratio is set at less than 80%, the hydrophobicity of the norbornene-based polymer is not too high. Consequently, there are tendencies that the solubility to a solvent increases and moisture permeation of the film decreases. On the other hand, when the compounding ratio is set at not less than 5%, there are tendencies that the norbornene-based polymer becomes hydrophilic and the moisture permeation increases. As mentioned above, the film having appropriate solubility and moisture permeation can be produced by adjusting the content of the repeating unit represented by the formula (I). Particularly, the compounding ratio is preferably set in the above range in that since a water-soluble polarizing element is bonded as a film for the liquid crystal display device, the film can possess an appropriate moisture permeability.

As the above other repeating unit, a repeating unit derived from norbornene-based compounds are preferable, and a repeating unit represented by the following formula (II) is more preferable.

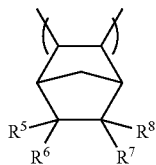

wherein $R^5$, $R^6$, $R^7$ and $R^8$ each represent a hydrogen atom, an alkyl group which may possess a substituent group, an aryl group which may possess a substituent group or -L"-O—CO—$R^9$ (L" is a bivalent linking group or a single bond, and $R^9$ is an alkyl group), provided that at least one of $R^5$, $R^6$, $R^7$ and $R^8$ is -L"-O—CO—$R^9$.

Preferable, that or those of $R^5$, $R^6$, $R^7$ and $R^8$ which is or are other than -L"-O—CO—$R^9$ is or are each a hydrogen atom or an alkyl group which may have a substituent group, more preferably a hydrogen atom or an alkyl group, and further preferably a hydrogen atom. Particularly, three of $R^5$, $R^6$, $R^7$ and $R^8$ are each preferably a hydrogen atom or an alkyl group which may possess a substituent group.

As to $R^5$, $R^6$, $R^7$ and $R^8$, the number of the substituent group(s) of the -L"-O—CO—$R^9$ is preferably 1 or 2, more preferably 1. $R^9$ is preferably an alkyl group having not more than 6 carbon atoms. Because, there is a tendency that the smaller the number of the carbon atom(s) contained in $R^9$ is, the smaller the optical elasticity is. Thus, $R^9$ is preferably an alkyl group having not more than 5 carbon atoms, and specifically a methyl group, an ethyl group, a propyl group, a butyl group and a pentyl group are more preferable.

L" denotes a bivalent linking group or a single bond. As the bivalent linking group, mention may be made of alkylene groups (preferably 1 to 10 carbon atoms, more preferably 1 to 5 carbon atom, particularly preferably 1 to 3 carbon atoms: for example, a methylene group (—$CH_2$—), an ethylene group (—$CH_2CH_2$—), a trimethylene group (—$CH_2CH_2CH_2$—), etc. are recited), arylene groups (preferably 6 to 30 carbon atoms, more preferably 6 to 20 carbon atoms, and particularly preferably 6 to 12 carbon atoms: for example, a phenylene group (—$C_6H_4$—), a naphthylene group (—$C_{10}H_6$—), etc. are recited), oxyalkylene groups (preferably 1 to 20 carbon atoms, more preferably 1 to 12 carbon atoms, and particularly preferably 1 to 8 carbon atoms: for example, an oxymethylene group (—$OCH_2$—), an oxyethylene group (—$OCH_2CH_2$—), etc. are recited), oxyarylene groups (preferably 6 to 20 carbon atoms, more preferably 6 to 16 carbon atoms, and particularly preferably 6 to 12 carbon atoms: for example, an oxyphenylene group (—$OC_6H_4$—), an oxynaphthalene group (—$OC_{10}H_6$—), etc. are recited), an oxycarbonyl group (—OCO—), an iminocarbonyl group (—CONH—), a carbonyl group (—CO—), an acetylene group (—CC—), an ureylene group (—NHCONH—), heteroatoms such as sulfur atom, oxygen atom, etc., amino groups (—NRa—: Ra denotes a substituent group), etc. Two or more of these linking groups can be combined together. Further, the linking groups may be replaced by substituent group(s).

L" is preferably a single bond or an alkylene group, more preferably a single bond or an alkylene having not more than 3 carbon atoms, and further preferably a single bond or an methylene group.

The repeating unit represented by the formula (II), for example, may be obtained by polymerization of the following norbornene-based compound containing acyloxymethyl and the norbornene-based compound containing acyloxymethyl can be obtained by a Diels-Alder reaction between cyclopentadiene and corresponding allyl compound.

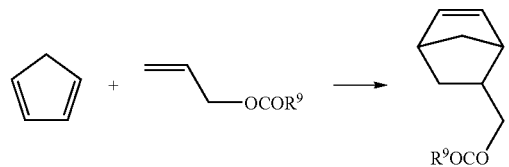

The monomers constituting the repeating units represented by the formulae (I) and/or (II) may be also generally synthesized as follows. A norbornene compound I is obtained by a Diels-Alder reaction between corresponding olefin and cyclopentadiene (obtained by thermally decomposing dicyclopentadiene) (Path 1) or by introducing an aryl group into norbornadiene (Synthesis 1998, Page 1249, Tetrahedoron 1989, Vol. 45, Page 5263) (Path 2: L=L'=single bond, A=A'=$C_6H_5$ is recited). A norbornene-based compound II is obtained by a Diels-Alder reaction between corresponding olefin and cyclopentadiene (obtained by thermally decomposing dicyclopentadiene) (Path 3). A homopolymer or a copolymer can be obtained by the above polymerization method. The compounding ratio between the repeating unit represented by the formula (I) and the repeating unit represented by the formula (II) (X:100-X) can be adjusted by appropriately changing the mixing ratio. Meanwhile, the norbornene-based compound (I) and two or more other norbornene-based compounds may be copolymerized.

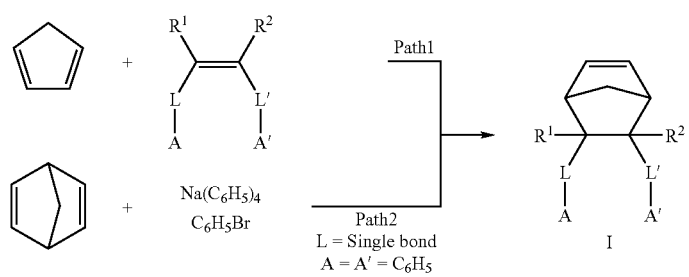
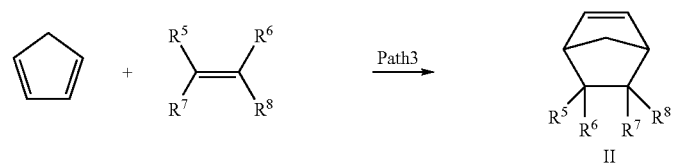
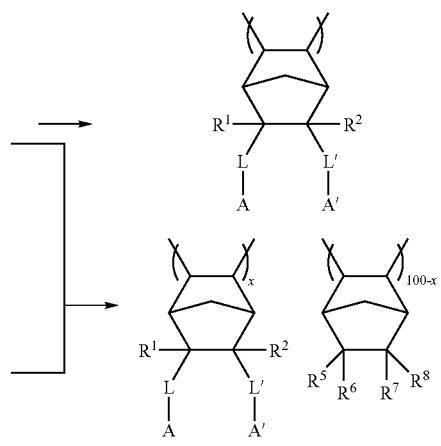
Examples of the homopolymers in the norbornene-based polymers of the present invention are shown below, but the invention is not limited thereto.
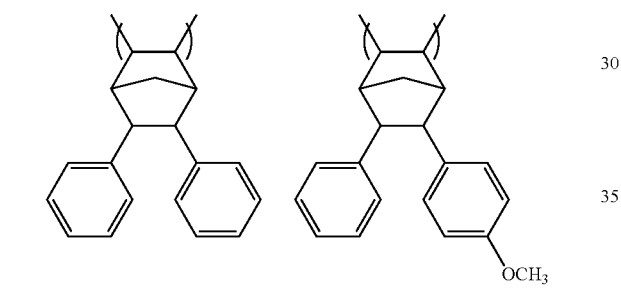
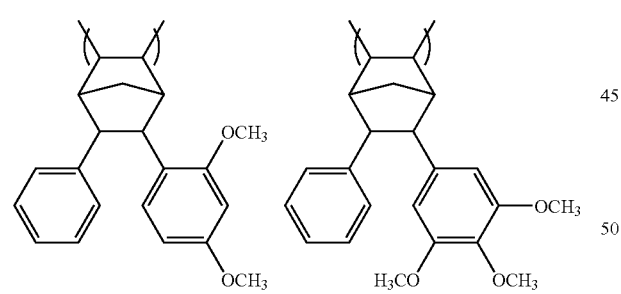
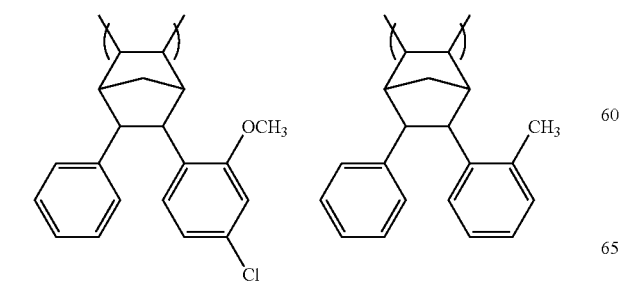
-continued
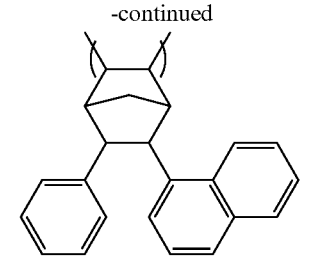
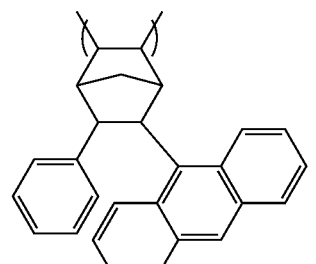
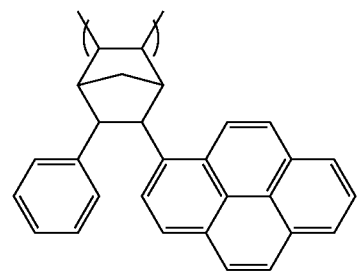
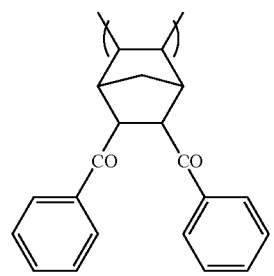

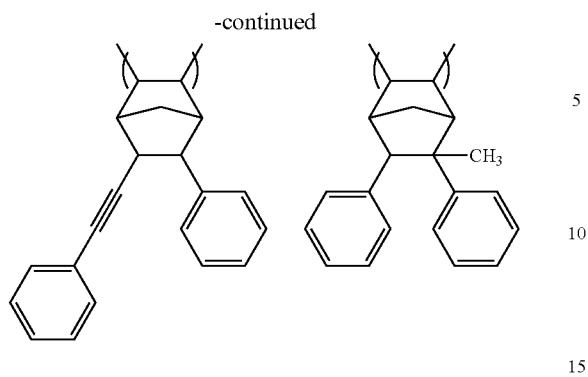
Examples of the copolymers in the norbornene-based polymers of the present invention are shown below, but the invention is not limited thereto. "X" and "100-X" give the compounding ratio of the copolymer, and a range of X is preferably 0<X<80, more preferably 0<X<60, and further preferably 5<X<40.
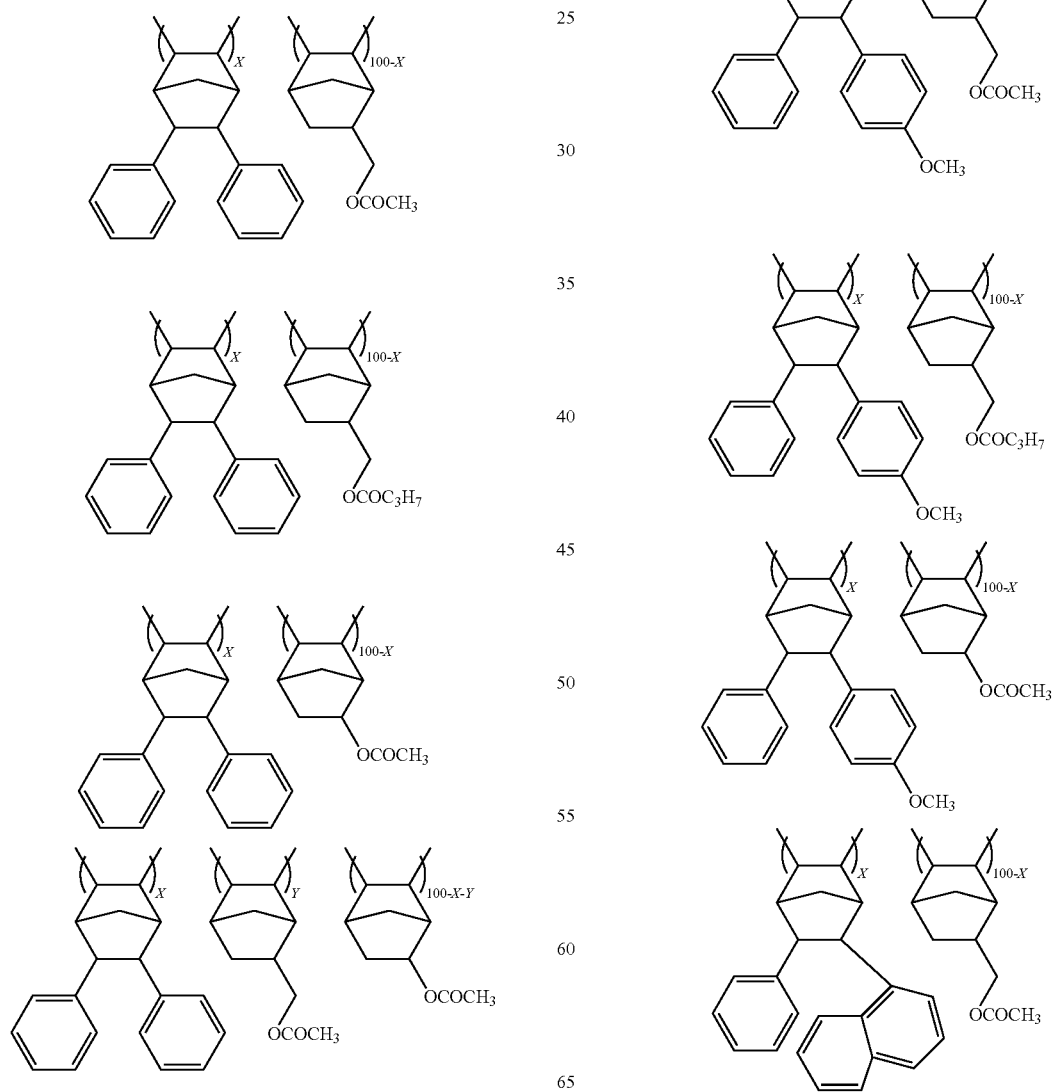
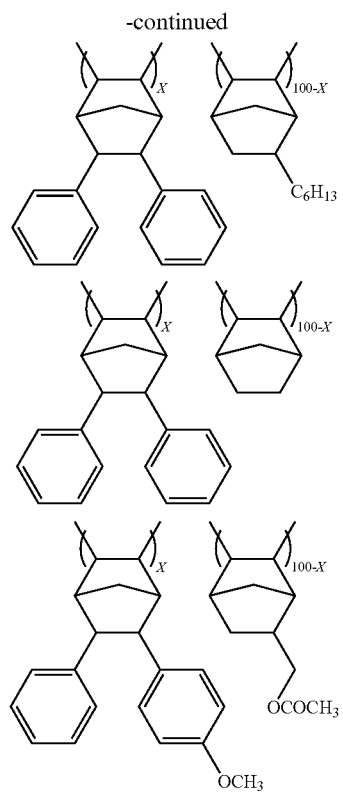

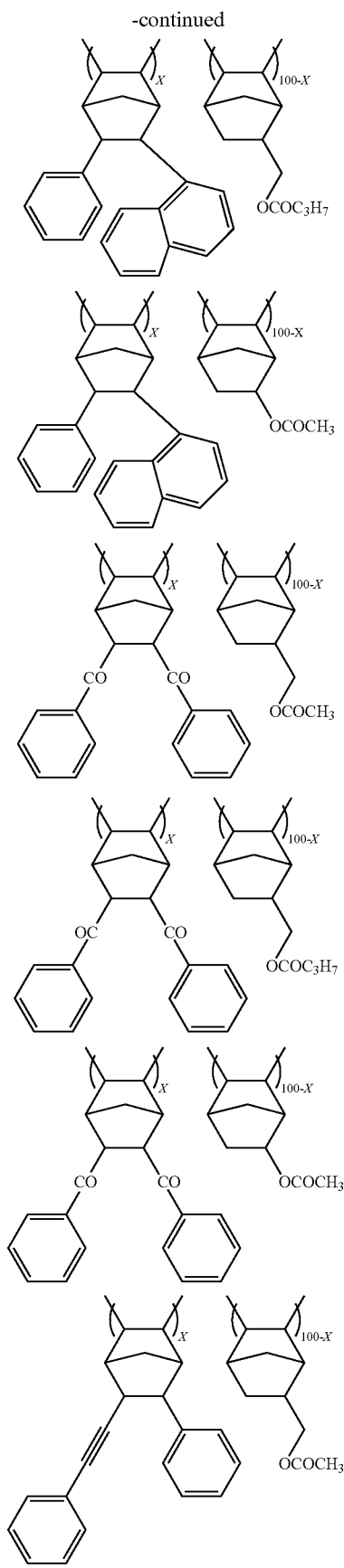

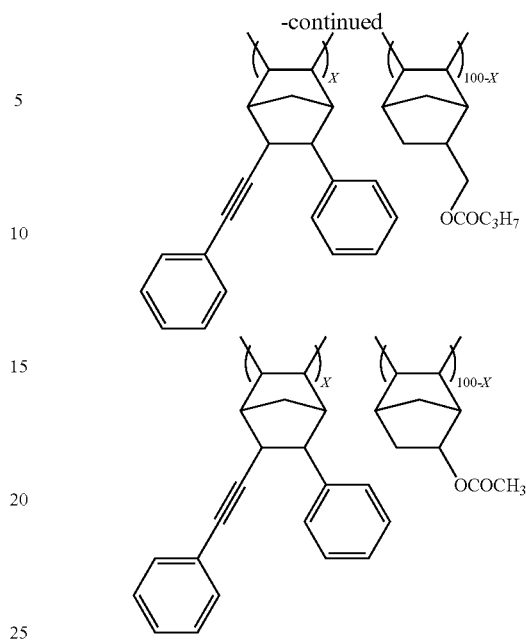

[Norbornene-Based Polymer (2)]

In order to effectively alter a wavelength dispersion characteristic of a refractive index, a norbornene polymer having a substituent group containing an aromatic compound from which a hydrogen atom is removed having a local maximum absorption wavelength in 300 nm to 400 nm and a molar absorption coefficient of 10 to 100,000 mol$^{-1}$dm$^3$cm$^{-1}$ at the local maximum absorption wavelength (hereinafter referred to as "a substituent group containing a compound from which a hydrogen atom is removed") is also employed. The substituent number of the substituent group containing a compound from which a hydrogen atom is removed in one repeating unit derived from a norbornene-based compound is not particularly limited, but is preferably 1 or 2 and more preferably 1, because of ease in synthesis. The norbornene-based polymer of the present invention may include one or more kinds of repeating units derived from norbornene-based compounds. The number of the kind is not particularly limited and, for example, the polymer consisting of one kind of a repeating unit is favorably used. A main chain of the polymer is constituted of a carbon hydride and the absorption thereof is at most 300 nm. Also, the absorption of the carbonyl group of a norbornene-based polymer having a substituent group such as a carbonyl group on a side chain is at most 300 nm.

The aromatic compound having the local maximum absorption wavelength in 300 nm to 400 nm and the molar absorption coefficient of 10 to 100,000 mol$^{-1}$dm$^3$cm$^{31\ 1}$ at the local maximum absorption wavelength has at least one local maximum absorption wavelength in 300 nm to 400 nm, but in which a compound in which the peak of the local maximum absorption wavelength is less than 300 nm and the foot of the local maximum absorption wavelength is at least 300 nm is not included. Therefore, the compound does not include benzene, acetoxybenzene, methoxybenzene, phenol and styrene.

The aromatic compound having the local maximum absorption wavelength in 300 nm to 400 nm has at least one local maximum absorption wavelength in 300 nm to 400 nm, but it may have a local maximum absorption wavelength in the other range. However, it is preferable that the compound does not have a local maximum absorption wavelength in the other range.

The larger the molar absorption coefficient of the aromatic compound having the local maximum absorption wavelength in 300 nm to 400 nm is, the greater the effect of the variation of the wavelength dispersion characteristic of a refractive index tends to be. The aromatic compound having the local maximum absorption wavelength in 300 nm to 400 nm concerning the present invention has the molar absorption coefficient of 10 to 100,000 at the local maximum absorption wavelength, and when the molar absorption coefficient is at least 100, the effect is remarkable. Therefore, the aromatic compound having the local maximum absorption wavelength in 300 nm to 400 nm concerning the present invention has the molar absorption coefficient of 100 to 100,000, preferably 120 to 100,000 and more preferably 130 to 100,000.

Examples of the aromatic compound having the local maximum absorption wavelength in 300 nm to 400 nm and the molar absorption coefficient of 10 to 100,000 at the local maximum absorption wavelength are shown below, but the present invention is not limited thereto.

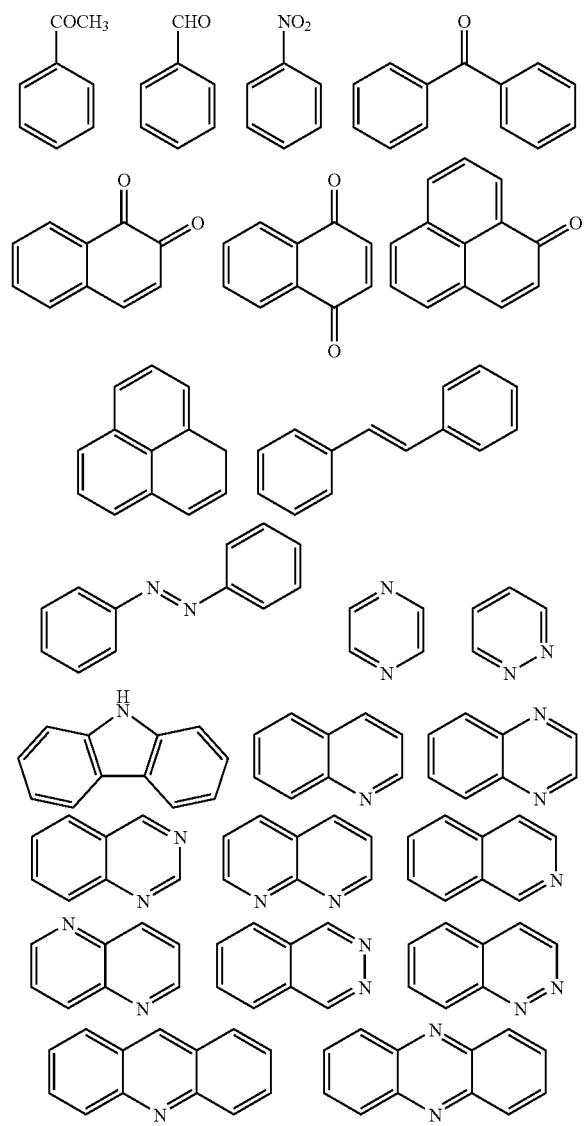

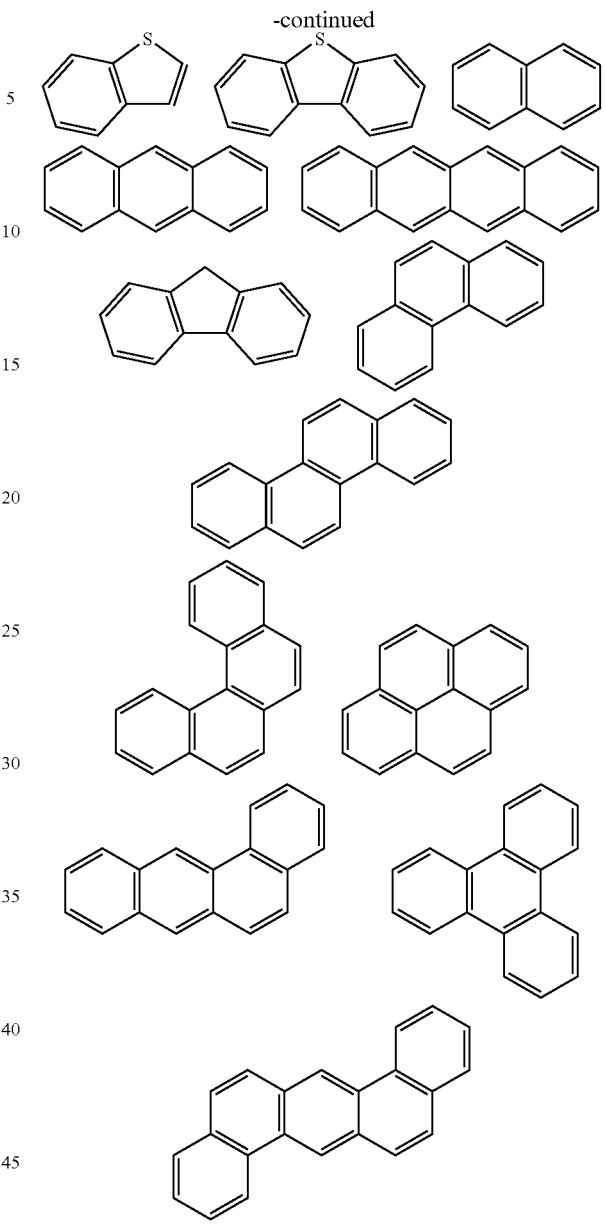

-continued

Of these, a 2-ring to 4-ring fused aromatic compound, for example, naphthalene, anthracene, phenanthrene, pyrene, chrysene, is preferable because the compounds have the molar absorption coefficient of 100 to 10,000 at the local maximum absorption wavelength in 300 nm to 400 nm and do not have the absorption in at least 400 nm.

The norbornene-based polymer of the present invention contains an aromatic compound having the local maximum absorption wavelength in 300 nm to 400 nm from which a hydrogen atom is removed. The compound from which a hydrogen atom is removed may be a compound from which one hydrogen atom is removed or a compound from which two hydrogen atoms are removed, and the compound from which one hydrogen atom is removed is preferable. When the compound from which one hydrogen atom is removed is present in a side chain of the norbornene-based polymer, they may bond directly or through spacer. The bond through spacer is not preferable in view of controlling of the wavelength dispersion characteristics of a refractive index of the polymer film, because the state of the aromatic ring becomes random. The shorter spacer is more preferable. On the other hand, the direct bond is preferable in view of controlling the wavelength dispersion characteristics of a reflective index of the polymer film, because the state of the aromatic ring becomes rigid.

The repeating unit derived from the norbornene-based compound concerning the present invention is preferably exemplified by a repeating unit represented by the following formula (I-I).

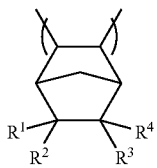

wherein $R^1$, $R^2$, $R^3$ and $R^4$ each represent a hydrogen atom, an alkyl group which may possess a substituent group, an aryl group which may possess a substituent group or a substituent group containing an aromatic compound from which a hydrogen atom is removed having a local maximum absorption wavelength in 300 nm to 400 nm and a molar absorption coefficient of 10 to 100,000 at the local maximum absorption wavelength, and at least one of the $R^1$, the $R^2$, the $R^3$ and the $R^4$ is the substituent group containing the compound from which a hydrogen atom is removed.

Each of the $R^1$, the $R^2$, the $R^3$ and the $R^4$ other than the substituent group containing an aromatic compound from which a hydrogen atom is removed having a local maximum absorption wavelength in 300 nm to 400 nm and a molar absorption coefficient of 10 to 100,000 at the local maximum absorption wavelength, is preferably a hydrogen atom, alkyl group having 1 to 20 carbon atoms or an aryl group having 6 to 20 carbon atoms, more preferably a hydrogen atom, alkyl group having 1 to 4 carbon atoms or a phenyl group, further more preferably a hydrogen atom or a phenyl group and particularly more preferably a hydrogen atom. The number of the substituent group containing an aromatic compound from which a hydrogen atom is removed having a local maximum absorption wavelength in 300 nm to 400 nm is preferably larger in view of the effect of the present invention, while the number thereof is preferably one or two, more preferably one for the ease in synthesis. Preferably, one of the $R^1$, the $R^2$, the $R^3$ and the $R^4$ is a hydrogen atom and two of the other are a hydrogen atom or a phenyl group, and more preferably, all of them are a hydrogen atom.

At least one of the $R^1$, the $R^2$, the $R^3$ and the $R^4$ is the substituent group containing an aromatic compound from which a hydrogen atom is removed having a local maximum absorption wavelength in 300 nm to 400 nm and a molar absorption coefficient of 10 to 100,000 at the local maximum absorption wavelength (hereinafter referred to as "the substituent group A"). The substituent group A is the same as the above and the preferable scope thereof is the same. That is, the preferable scope of the substituent group containing an aromatic compound from which a hydrogen atom is removed having a local maximum absorption wavelength in 300 nm to 400 nm and a molar absorption coefficient of 10 to 100,000 at the local maximum absorption wavelength, the preferable scope of the compound having the molar absorption coefficient of 10 to 100,000 at the local maximum absorption wavelength and the preferable bond style between the compound from which one hydrogen atom is removed and a norbornane (the style of directly bonding or the style of bonding through spacer) and the like are the same, respectively.

In the formula (I-I), the bonding style of the substituent A is preferably exo-bonding. When the exo-bonding style is employed, the aromatic ring of the substituent A is perpendicular to the main chain, and the wavelength dispersion characteristic of such norbornene-based polymer film is effectively exhibited. Particularly, when the compound from which a hydrogen atom is removed directly bonds a norbornane, the effect is remarkable. Therefore, in the repeating unit represented by the formula (I-I), exo-bonding preferably makes up 50 to 100%, more preferably 70 to 100% and further more preferably 100%.

The norbornene-based compound containing the substituent A can be obtained by a Diels-Alder reaction between cyclopentadiene and corresponding olefin. The exo form can be synthesized by coupling norbornadiene and A-X (halogenoid A) under palladium catalyst.

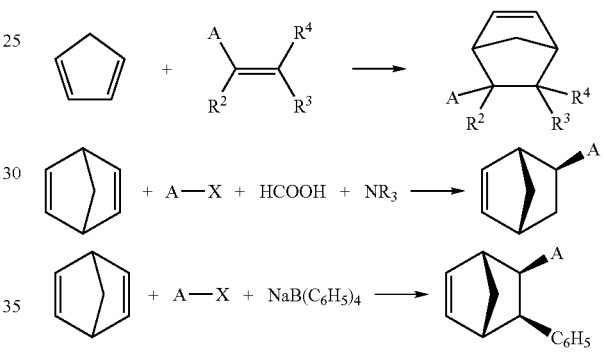

Examples of the repeating units represented by the following formula (I-I) are shown below, but the invention is not limited thereto.

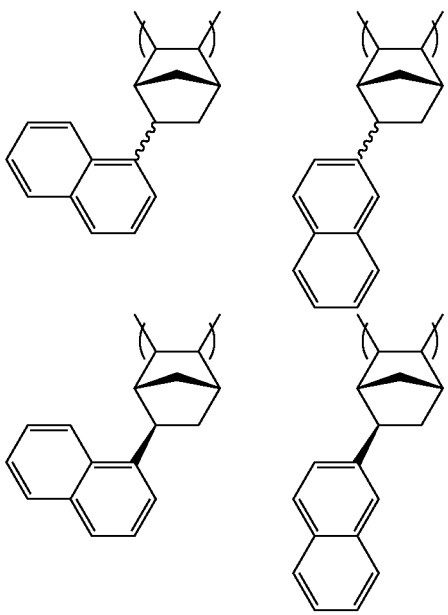

-continued

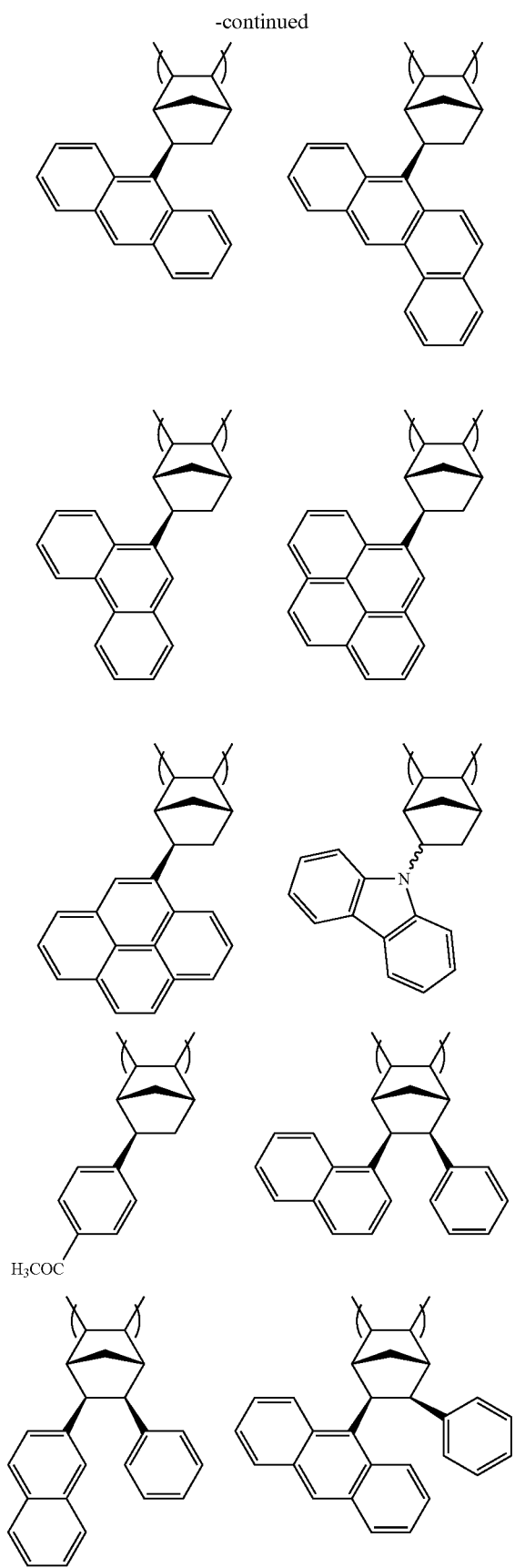

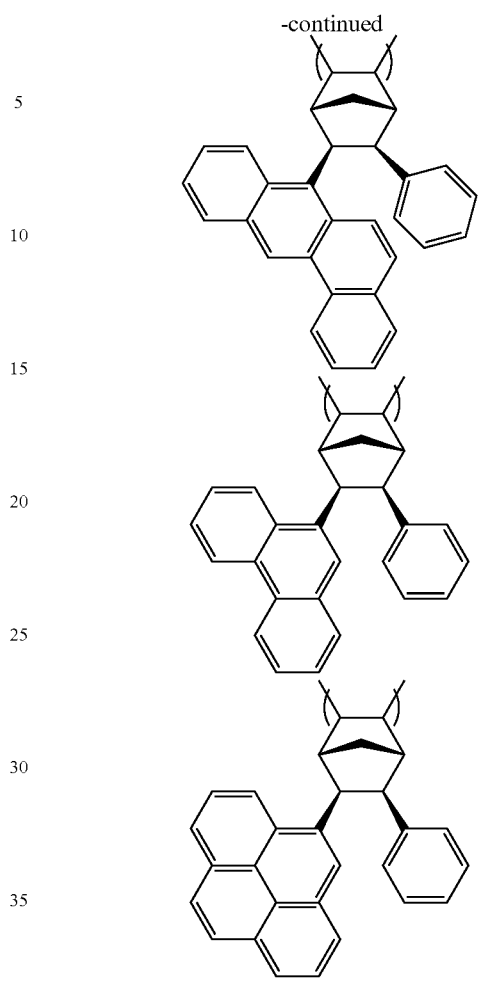

The norbornene-based polymer containing the repeating unit represented by the following formula (I-I) may include other norbornen-based compound unless no deviation occurs from the purpose of the present invention. The amount of the repeating unit represented by the following formula (I-I) in the norbornene-based polymer of the present invention may be accordingly adjusted within the range of 0% to 100% of the polymerization percentage of the repeating unit represented by the formula (I-I) depending on the kind of the substituent A or the like. The amount is preferably more than 0 to not less than 80%, more preferably more than 0 to not less than 60%, further more preferably 3 to 50%, particularly preferably 3 to 40%. When there is little amount of the repeating unit represented by the formula (I-I), the controlling effect of the wavelength dispersion characteristic of a refractive index of the norbonene-based polymer tends to become small, and when there is much amount thereof, the effect tends to become large. The repeating unit represented by the following formula (I-I) has a disadvantage in a film production in that its polymer has less solubility and a too high glass transition point because the repeating unit has an adamant aromatic ring. In order to resolve these problems, it is preferable to co-polymerize at least one kind of a norbornene-based compound having polar group. A repeating unit represented by the formula (III) is exemplified as the norbornene-based compound having polar group.

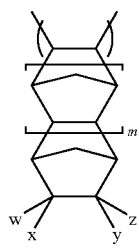

Wherein w, x, y, z each represent a hydrogen atom, alkyl group, aryl group, a halogen atom, —(CH$_2$)nOH, —(CH$_2$)nCOOH, —(CH$_2$)nCOOR', —(CH$_2$)nOR', —(CH$_2$)nOCOR', —(CH$_2$)nOCOOR', —(CH$_2$)OR', —(CH$_2$)nO(CH$_2$)nOH, at least one of w, x, y, z is —(CH$_2$)nOH, —(CH$_2$)nCOOH, —(CH$_2$)nCOOR', —(CH$_2$)nOR', —(CH$_2$)nOCOR', —(CH$_2$)nOCOOR', —(CH$_2$)OR', —(CH$_2$)nO(CH$_2$)nOH, n represents an integer of 0 to 10, R' is represents an alkyl group having 1 to 10 carbon atoms, and m represents 0 or 1.

The monomer which the m is zero can be obtained by a Diels-Alder reaction between cyclopentadiene and corresponding olefin. The monomer which the m is 1 can be obtained by reacting the monomer which the m is zero with cyclopnetadiene.

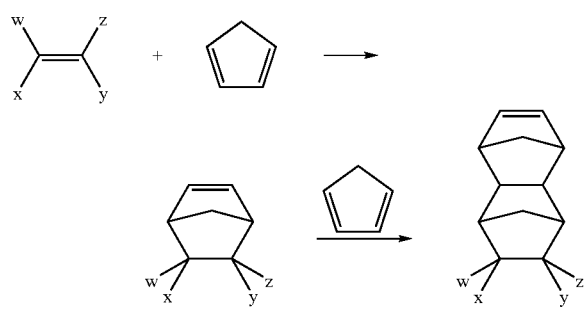

Examples of the repeating units represented by the following formula (III) are shown below, but the invention is not limited thereto.

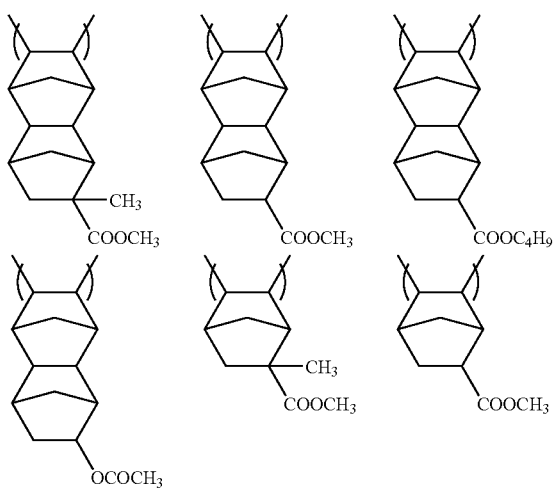

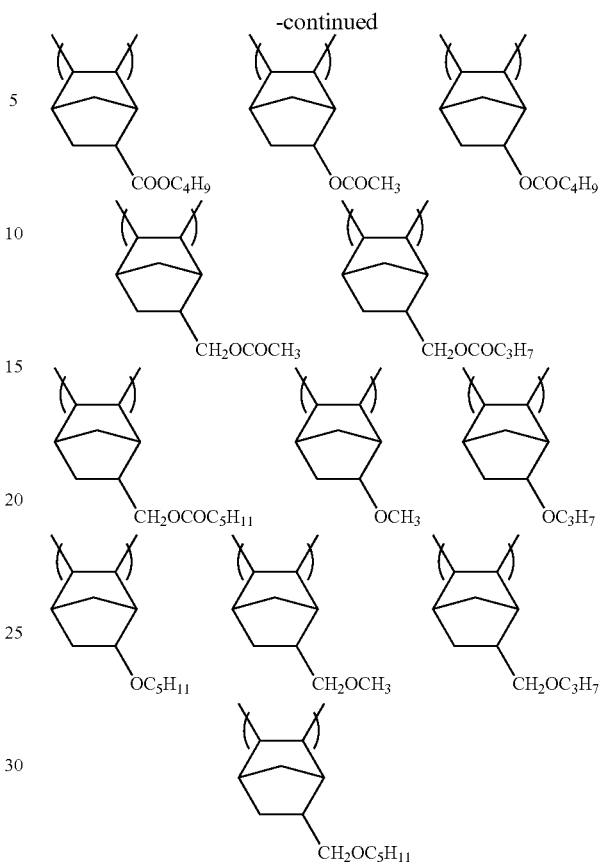

The m is preferably 0 because the glass-transition temperature is lowered. Of those, the repeating unit represented by the formula (II) described in the above norbornene-based polymer (1) is preferably employed. In particular, the norboernene-based polymer of the present invention preferably consists of the repeating unit represented by the formula (I-I) and the repeating unit represented by the formula (II), wherein the word "consists of" means the polymer which include other component within the scope of the purpose of the present invention as well as the polymer which does not include any other component. For example, the polymer may include a monomer comprising these repeating unit and reactant remaining elements. In this case, the preferable polymerization percentage of the repeating unit represented by the formula (I-I) may be accordingly adjusted and is preferably more than 0 to not less than 80%, more preferably more than 0 to not less than 60%, further more preferably 3 to 50%, and particularly preferably 3 to 40%.

When the polymer includes the repeating unit represented by the formula (II) and the repeating unit represented by the formula (I-I), L" is preferably a single bond or an alkylene group having 1 to 10 carbon atoms, more preferably a single bond or an alkylene group having 1 to 5 carbon atoms, further more preferably a single bond or an alkylene group having one or two carbon atoms, and particularly preferably a single bond or methylene group. When the polymer includes the repeating unit represented by the formula (II) and the repeating unit represented by the formula (I-I), the carbon atom number of R$^9$ is preferably smaller in view of lowering the optical elasticity of the film, but the carbon atom number of R$^9$ is preferably larger in view of lowering the glass transition temperature of the film. Considering of the both, R$^9$ is preferably an alkyl group having 1 to 10 carbon atoms, more preferably an alkyl group having 1 to 6 carbon atoms, further more preferably an alkyl group having 3 to 5 carbon atoms, and particularly preferably a propyl group, a butyl group and a pentyl group.

The formula (II) is preferably the same scope as the scope of the formula (II) which is explained in the norbornene-based polymer (1) except the above mentioned points.

Examples of the polymer including the repeating unit represented by the formula (I-I) and the repeating unit represented by the formula (II) are shown below, but the invention is not limited thereto.

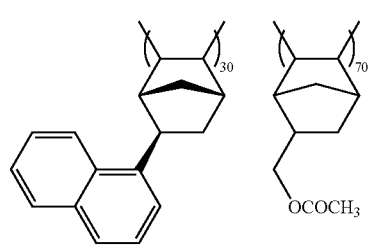

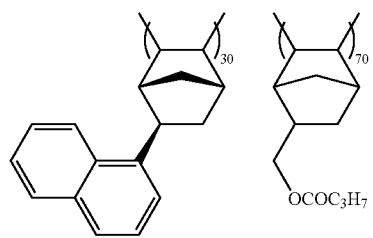

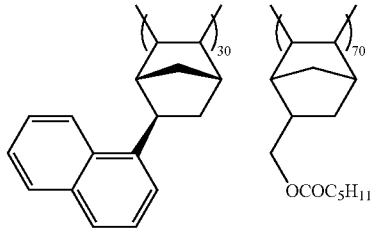

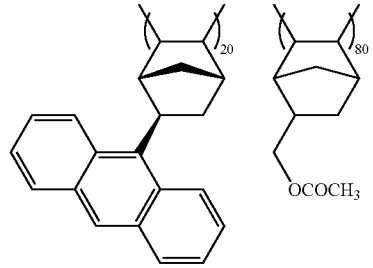

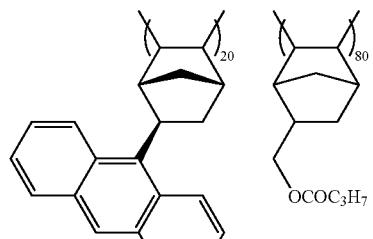

-continued

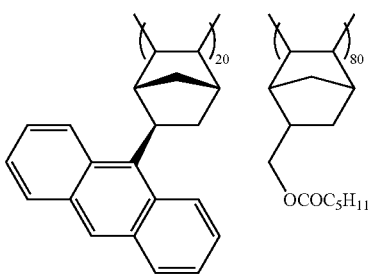

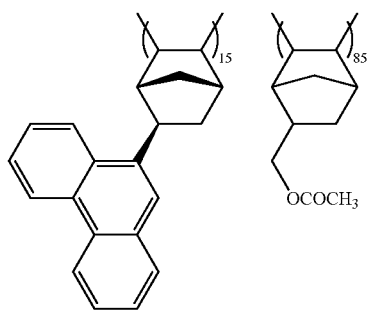

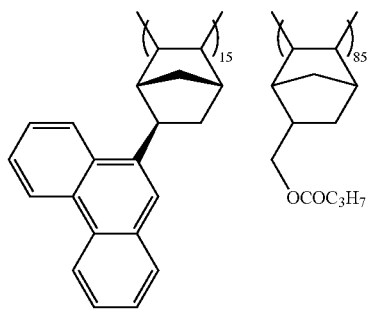

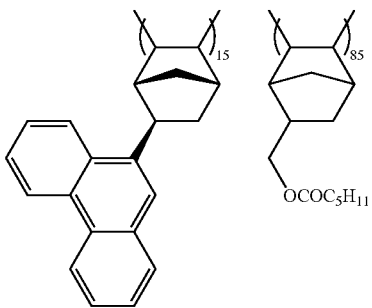

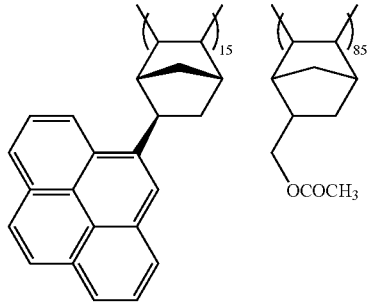

-continued

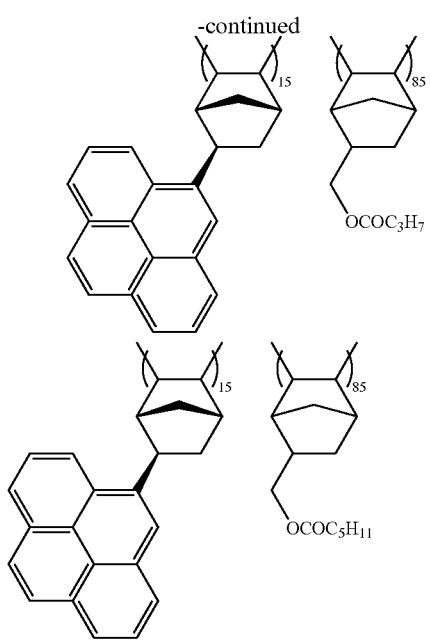

The norbornene-based polymers (1) and (2) of the present invention has the number average molecular weight (Mn) on polystyrene conversion of preferably 10,000 to 1,000,000, and more preferably 50,000 to 500,000 when measured by a gel-permeation chromatography using tetrahydrofuran as a solvent. On the other hand, the polymer has the weight average molecular weight (Mw) on polystyrene conversion of preferably 15,000 to 1,500,000, and more preferably 70,000 to 700,000.

When the number average molecular weight on polystyrene conversion are set to not less than 10,000 and the weight average molecular weight on polystyrene conversion are set to not less than 15,000, the breaking strength tends to be better. On the other hand, when the number average molecular weight on polystyrene conversion are set to not more than 1,000,000 and the weight average molecular weight on polystyrene conversion are set to not more than 1,500,000, there are tendencies that moldability of sheets is improved and that when a cast film or the like is to be formed, the viscosity of a solution decreases, and so the polymer is easily handled. The molecular weight distribution (weight average molecular weight/number average molecular weight) is preferably 1.1 to 5.0, more preferably 1.1 to 4.0, and further preferably 1.1 to 3.5. When the molecular weight distribution of the norbornene-based polymer is set in the above range, it is likely that the solution of the norbornene-based polymer (dope) becomes homogeneous, which easily forms a good film.

The norbornene-based polymers (1) and (2) of the present invention can be obtained by the following producing method. That is, the norbornene-based polymer of the present invention can be obtained by homopolymerizing a monomer or copolymerizing monomers in a solvent in a range of 20 to 150° C. with use of a catalyst: [Pd(CH$_3$CN)$_4$][BF$_4$]$_2$, di-µ-chloro-bis-(6-methoxybicyclo[2.2.1]hepto-2-ene-end-5σ, 2π)-Pd (hereinafter briefly referred to as [I]) and methyl aluminoxane (MAO), I and AgBF$_4$, I and AgSbF$_6$, [(η$^3$-allyl)PdCl]$_2$ and AgSbF$_6$, [(η$^3$-allyl)PdCl]$_2$ and AgBF$_4$, [(η$^3$-crotyl)Pd(cyclooctadiene) [PF$_6$], [(η$^3$-allyl)Pd[(η$^5$-cyclopentadienyl)]$_2$, tricyclohexylphosphine and dimethyl anilinium tetrakispentafluorophenyl borate or trityltetrakispentafluorophenyl borate, palladium bis(acetylacetonato), tricyclohexyl phosphine and dimethyl anilinium tetrakispentafluorophenyl borate, [(η$^3$-allyl)PdCl]$_2$, tricyclohexyl phosphine and tributylallyl tin or allyl magnesium chloride and dimethyl anilinium tetrakispentafluorophenyl borate, [(η$^5$-cyclopentadienyl)Ni(methyl)(triphenylphosphine)] and trispentafluorophenyl borane, [(η$^3$-crotyl)Ni(cyclooctadiene)][B((CF$_3$)$_2$C$_6$H$_4$)$_4$], [NiBr(NPMe$_3$)]$_4$ and MAO, Ni(o-ctoate)$_2$ and MAO, Ni(octoate)$_2$, B(C$_6$F$_5$)$_3$ and AlEt$_3$, Ni(o-ctoate)$_2$, [ph$_3$C][B(C$_6$F$_5$)$_4$] and Ali-Bu$_3$, or Co(neodecanoate) and a cation complex of MAO or the like and Ni, Pd, Co or the like in Periodic Table VIII or a catalyst forming such a cation complex. The solvent can be selected from alicyclic hydrocarbon solvents such as cyclohexane, cyclopentane, methylcyclopentane, etc.; aliphatic hydrocarbon solvents such as pentane, hexane, heptane, octane, etc.; aromatic hydrocarbon solvents such as toluene, benzene, xylene, etc.; halogenated hydrocarbon solvents such as dichloromethane, 1,2-dichloroethylene, chlorobenzene, etc.; and polar solvents such as ethyl acetate, butyl acetate, γ-butylolactone, propylene glycol dimethyl ether, nitromethane, etc. Further, as other synthesis methods, methods described in Macromolecules, 1996, Vol. 29, page 2755, Macromolecules, 2002, Vol. 35, page 8969 and WO/2004/7564 are favorably used.

[Films of Norbornene-Based Polymer]

The norbornene-based polymers of the present invention are useful as materials for films. Particularly, the films obtained by using the above polymers are suitable as films for optical applications, including substrates of liquid crystal display devices, light guide plates, polarizing films, retardation films, liquid crystal back lights, liquid crystal panels, OHP films, transparent electroconductive films, etc. The norbornene-based polymers represented by the above formula (I) are favorably used as optical materials for optical discs, optical fibers, lenses, prisms, etc., electronic parts, medical instruments, containers, etc.

[Method for Producing Films of Norbornene-Based Films]

The film of the present invention comprises the above mentioned norbornene-based polymer containing the repeating units represented by the above formula (I), and can be produced by forming a film with the this polymer as a raw material. For the formation of the film, a thermal fusion film-forming method and a solution film forming method are exemplified, and any of them is applicable. In the present invention, it is preferable to use the solution film-forming method, which can produce a film having an excellent surface. In the following, the solution film-forming method will be explained.

(Solution Film-Forming Method)

(Preparation of a Dope)

First, a solution (dope) of the above polymer to be used in film forming is prepared. An organic solvent to be used in the preparation of the dope is not particularly limited, so long as dissolving, flow casting and film forming are possible and the purposes thereof can be attained. A solvent is preferable, which is selected from chlorine-based solvents represented by dichloromethane and chloroform, straight-chain hydrocarbons having 3 to 12 carbon atoms (hexane, octane, isooctane, decane, etc.), cyclic hydrocarbons (cyclopentane, cyclohexane, decalin, etc.), aromatic hydrocarbons (benzene, toluene, xylene, etc.), esters (ethyl formate, propyl formate, pentyl formate, methyl acetate, ethyl acetate, pentyl acetate, etc.), ketones (acetone, methylethyl ketone, diethyl ketone, diisobutyl ketone, cyclopentanone, cyclohexanone, methyl cyclohexanone, etc.), ethers (diisopropyl ether, dimethoxy methane, dimethoxy ethane, 1,4-dioxane, 1,3-dioxorane, tetrahydrofuran, anisole, phenetol, etc.). As examples of organic solvents having two or more functional groups, 2-ethoxyethyl acetate, 2-methoxyethanol and 2-butoxyethanol are recited. Preferred boiling points of the organic solvents are 35° C. to not more than 200° C. As to the solvents to be used for the preparation of the above solution, a mixture of two or more kinds of the solvents can be used to adjust physical properties of the solvents, such as a drying property, viscosity, etc. Further, a poor solvent can be added, so long as it is solved in a mixed solvent.

A preferable poor solvent can be appropriately selected. When a chlorine-based organic solvent is used as a good solvent, an alcohol can be favorably used. The alcohols may be preferably linear, branched or cyclic. Among them, a saturated aliphatic hydrocarbon is preferable. The hydroxyl groups of the alcohols may be any of primary to tertiary. Further, fluorine-based alcohols are used as the alcohols. For example, 2-fluoroethanol, 2,2,2-trifluoroethanol, 2,2,3,3-tetrafluoro-1-propanol, etc. are recited. Among the poor solvents, monovalent alcohols are preferably used, because they particularly have a peeling resistance-reducing effect. Particularly preferable alcohols change depending upon the good solvent selected, but considering a drying load, preferably alcohols having boiling points of not more than 120° C., more preferably monovalent alcohols having 1 to 6 carbon atoms, and particularly preferably alcohols having 1 to 4 carbon atoms can be used.

A mixed solvent particularly preferable in preparing the dope is a combination of dichloromethane as a main solvent and one or more kinds selected from methanol, ethanol, propanol, isopropanol and butanol as a poor solvent.

In order to prepare the above dope, there are available a method in which dissolution is effected under stirring at room temperature, a cooling/dissolving method in which the polymer is swollen under stirring at room temperature, then cooled to −20° C. to −100° C. and dissolved by heating it to 20° C. to 100° C. again, a high temperature dissolving method in which the polymer is dissolved in a sealed container by raising the temperature to the boiling point of the main solvent, a method in which the polymer is dissolved by subjecting it to a high temperature and a high pressure up to a critical point of the solvent, etc. The viscosity of the dope is preferably in a range of 1 to 500 Pa·s, more preferably in a range of 5 to 200 Pa·s, at 25° C. The viscosity is measured as follows. A sample solution 1 mL is placed in a steel cone with a diameter of 4 cm/2°, which is placed in a rheometer (CLS500) (Both of the steel cone and the rheometer are manufactured by TA Instruments Co., Ltd.). After the sample solution is preliminarily kept at a measurement-starting temperature until the liquid temperature becomes constant, the measurement is started.

It is preferable that foreign matters such as a non-dissolved matter, dirt, impurities, etc. are filtered off from the solution using an appropriate filtering medium such as a metal net or a flannel before flow casing. The viscosity of the solution immediately before film forming may be in a range which enables flow casting in the film formation, and is adjusted preferably in a range of 5 Pa·s to 1000 Pa·s, more preferably in a range of 15 Pa·s to 500 Pa·s, and further preferably in a range of 30 Pa·s to 200 Pa·s. The temperature at that time is not particularly limited, so long as it is the temperature at the time of the flow casting. The temperature is preferably −5 to 70° C., and more preferably −5 to 35° C., (Additives)

The films of the present invention may contain additives having no relation to the production of the above norbornene-based polymer in such a range as not negating the purpose of the present invention. Such additives may be added in any stage in a process for producing the film according to the present invention. The additives can be selected depending upon uses. For example, a degradation-preventing agent, an ultraviolet rays protective agent, a retardation (optical anisotropy) adjusting agent, fine particles, a peeling accelerating agent, an infrared absorber, etc. are recited. These additives may be solid or oily. When the film is produced by the solution flow casting method, the additives may be added at any time during the dope-preparing process. Alternatively, the additives may be added at a finally adjusting step in the process of preparing the dope. When the film is produced by the melting method, the additives may be added at the time of preparing the resin pellets, or may be kneaded at the time of producing the film. An addition amount of each of the additives is not particularly limited, so long as the function is exhibited. When the film is constituted by plural layers, the kinds and addition amounts of the additives in the respective layers may differ.

The degradation-(oxidation-) preventing agent is preferably used from the standpoint of preventing the degradation of the film. For example, a phenol-based or hydroquinone-based antioxidant such as 2,6-di-tert-butyl, 4-methyl phenol, 4,4'-thiobis-(6-tert-butyl-3-methyl phenol), penthaerythritol-tetrakis [3-(3,5-di-tert-butyl-4-hydroxy phenyl)propionate or the like can be added. Further, it is preferable to add a phosphorus-based antioxidant such as tris(4-methoxy-3,5-diphenyl)phosphite, tris(nonylphenyl)phosphite, bis(2,4-di-tert-butylphenyl)pentaerythritol diphosphite or the like. The antioxidant is added in an amount of 0.05 to 5.0 parts by mass relative to 100 parts by mass of the polymer.

From the standpoint of preventing the degradation of the polarizing plate, the liquid crystals and the like, the ultraviolet absorbing agent is preferably used. From the standpoint of excellent ultraviolet absorbing capability in a wavelength range of not more than 370 nm and good liquid crystal displaying characteristics, the ultraviolet absorbing agent having less absorption of visible lights having wavelengths in a range of 400 nm or more is preferably used. As specific examples of the ultraviolet absorbing agent to be preferably used in the present invention, mention may be made of, for example, a hindered phenol-based compound, an oxybenzophenone-based compound, a benzotriazole-based compound, a salicylic acid ester-based compound, a benzophenone-based compound, a cyanoacrylate-based compound, a nickel complex-based salt, etc. The addition amount of the ultraviolet rays preventing agent is preferably 1 ppm to 1.0%, more preferably 10 to 1000 ppm with respect to the norbornene-based polymer in terms of mass ratio.

In order to improve a slipping property of the film surface, fine particles (a matting agent) are preferably used. When this agent is used, unevenness is given to the surface of the film, that is, roughness of the surface of the film is raised (matted), so that the films can be prevented from being blocked together. When the fine particles are present in the films or on at least one surface of the film, adhesion between a polarizing element and the film at the time of processing the polarizing plate is remarkably improved. The matting agent to be used in the present invention consists of fine particles having the average particle size of, for example, 0.05 μm to 0.5 μm, preferably 0.08 μm to 0.3 μm, and more preferably 0.1 μm to 0.25 μm in the case of fine inorganic particles. As to the fine particles, silicon dioxide, silicon, and titanium dioxide are preferable as the inorganic compound, whereas a fluorine resin, nylon, propylene and chlorinated polyether are preferable as polymer compounds. Among them, silicon dioxide is more preferable, and silicon dioxide having the surface treated with an organic material is further preferable.

In order to reduce the peeling resistance of the film, a peeling accelerator is preferably used. As preferable peeling agent, a phosphoric acid ester-based surface active agent, a carboxylic acid-based or carboxylic acid salt-based surface active agent, a sulfonic acid-based or sulfonic acid salt-based surface active agent, and a sulfuric acid ester-based surface active agent are effective. Fluorine-based surface active agents in which a part of hydrogen atom(s) bonded to hydrocarbon chain of each of the above surface active agents is replaced by fluorine atom(s) is also effective. The addition amount of the peeling agent is preferably 0.05 to 5 mass %, more preferably 0.1 to 2 mass %, and further preferably 0.1 to 0.5 mass % with respect to the norbornene-based polymer.

(Production of Films)

As a method and an apparatus for producing the films of the present invention, a solution flow casting/film-producing method and a solution flow casting/film-producing apparatus similar as served in the production of publicly known cellulose triacetate films are preferably used. Once a dope prepared in a dissolving machine (kettle) is stored in a storing kettle, foams contained in the dope are removed to prepare a final dope.

Cellulose acylate film-producing techniques described in JP-A 2000-301555, JP-A 2000-301558, JP-A H07-032391, JP-A H03-193316, JP-A H05-086212, JP-A S62-037113, JP-A H02-276607, JP-A S55-014201, JP-A H02-111511 and JP-A H02-208650 can be preferably used in the present invention.

(Flow Casting of Multiple Layers)

A dope may be flow cast on a flat and smooth band or drum as a metallic support in the form of a single layer liquid or two or more layers of plural dopes may be flow cast thereon. In the case of the multiple-layer flow casting, no limitation is posed upon the thickness of the inner side layer or the outer side layer. However, the outer side has a thickness of preferably 1 to 50%, more preferably 2 to 30% of the entire thickness of the film.

(Flow Casting)

As the solution flow casting method, there are a method in which the prepared dope is uniformly extruded onto a metallic support from a pressurizing die, a doctor blade method in which the thickness of the dope once flow cast on a metal support is adjusted with a blade, a reverse roll coater method in which the thickness is adjusted with a reversely turning roll, etc. The pressurizing die method is preferred. The temperature of the dope used in the flow casting is preferably −10 to 55° C., more preferably 25 to 50° C. In that case, the temperature may be identical over the entire steps, or may be different in a part of the steps. When the temperature differs, the temperature is preferably at a desired level immediately before the flow casting.

(Drying)

In order to dry the dope on the metallic support in the production of the film, there are generally a method in which hot air is blown upon a front surface side of the metallic support (for example, the drum or the band), that is, hot air is blown upon a front surface of the web on the metallic support, a method in which hot air is blown upon a back surface of the drum or band, a liquid heat conduction method in which a temperature-controlled liquid is brought into contact with a back surface opposite to the dope flow casting surface of the band or drum so that the surface temperature may be controlled by heating the drum or band through heat conduction, etc. The back surface liquid heat conduction system is preferable. The temperature of the surface of the metallic support before the flow casting may be any level, so long as the surface temperature is not more than the boiling point of a solvent used in the dope. However, in order to accelerate the drying or take away the flowability of the dope on the metallic support, it is preferable that the surface temperature is set lower, by 1 to 10° C., than the boiling point of a solvent having the lowest boiling point among the solvents used. However, the above is not applicable when the flow cast dope is cooled and peeled without being dried.

(Peeling)

When a half dried film is peeled from the metallic support and if the peeling resistance (peeling load) is large, the film is irregularly stretched in the film-forming direction to cause optically anisotropic unevenness. Particularly when the peeling load is large, stretched portions and non-stretched portions are stepwise and alternatively formed in the film-forming direction, so that a distribution in the retardation occurs. When such a film is mounted on a liquid crystal display device, a linear or a band-like unevenness comes to appear. In order to prevent the occurrence of such a problem, it is preferably to set a peeling load upon the film at not more than 0.25N per a film-peeling width of 1 cm. The peeling load is more preferably not more than 0.2 N/cm, more preferably not more than 0.15 N/cm, and particularly preferably not more than 0.10 N/cm. The peeling load is particularly preferably not more than 0.2 N/cm, because unevenness based on the peeling is not observed at all in this range even in the case of a liquid crystal display device which would be likely to develop unevenness. As a method for reducing the peeling load, there are a method in which the peeling agent is added as mentioned above and a method in which the composition of the solvent to be used is selected. A preferable concentration of the residual volatile components at the time of peeling is 5 to 60 mass %, more preferably 10 to 50 mass %, particularly preferably 20 to 40 mass %. It is preferable to peel the film in a state with a high concentration of the volatile components, because the drying speed is increased to raise the productivity. On the other hand, since the film has small strength and elasticity in the state with the high concentration of the volatile components, it will be cut or elongated by the peeling force. In addition, the peeled film has a poor self-sustaining force, so that it is likely to be deformed, get wrinkled and cause knicks. Further, this causes a distribution in the retardation.

(Stretching)

When the film produced by the above solution film-forming method is further stretched, it is preferable to stretch the film in the state that the solvent still sufficiently remains in the film immediately after peeling. Stretching is performed to (1) obtain the film having excellent flatness free from wrinkle and deformation and (2) increase an in-plane retardation. When the film is stretched for the purpose of (1), stretching is performed at a relatively high temperature and a low stretching magnification of 1% to 10% at the most. Stretching at 2 to 5% is particularly preferable. When the film is stretched for the purpose of both (1) and (2) or (2) only, stretching is performed at a relatively low temperature and a stretching magnification of 5% to 150%.

The film may be stretched uniaxially in a vertical or lateral direction only or may be stretched biaxially simultaneously or subsequently. The birefringence of a retardation film for a VA liquid crystal cell or an OCB (Optically Compensatory Bend) liquid crystal cell is preferably such that the refractive index in the width direction is greater than that in a longitudinal direction. Therefore, the film is preferably stretched more largely in the width direction.

Although the thickness of the finished (dried) film of the present invention varies depending upon the use purpose, it is ordinarily in a range of 20 to 500 µm, preferably in a range of 30 to 150 µm. Particularly, the thickness is preferably 40 to 110 µm for the liquid crystal display device.

[Characteristics of Film]

In the film of the present invention, a difference $\Delta Re=Re630-Re450$ in which Re450 and Re630 are in-plane retardation values at wavelengths 450 nm and 630 nm, respectively, satisfies preferably 10 nm$\leq \Delta Re \leq$100 nm, more preferably 10 nm$\leq \Delta Re \leq$80 nm, and most preferably 10 nm$\leq \Delta Re \leq$60 nm.

Preferable optical characteristics of the films of the present invention differ depending upon uses of the films. In the following, preferable ranges of the in-plane retardation (Re) values and the thickness retardation (Rth) values are shown for respective uses when the film thickness is converted to 80 µm.

When the film is used as a protective film in a polarizing plate, Re satisfies preferably 0 nm$\leq$Re$\leq$5 nm, and more preferably 0 nm$\leq$Re$\leq$3 nm, whereas Rth satisfies preferably 0 nm$\leq$Rth$\leq$50 nm, more preferably 0 nm$\leq$Rth$\leq$35 nm, particularly preferably 0 nm$\leq$Re$\leq$10 nm.

When the film is used as a retardation film, the Re range and the Rth range vary. Although there are a variety of needs depending upon the kinds of the films, 0 nm$\leq$Re$\leq$100 nm and 0 nm$\leq$Rth$\leq$400 nm are preferable. It is more preferable that 0 nm$\leq$Re$\leq$20 nm and 40 nm$\leq$Rth$\leq$80 nm for the TN mode and 20 nm$\leq$Re$\leq$80 nm and 80 nm$\leq$Rth$\leq$400 nm for the VA mode. Particularly preferable ranges in the case of the VA mode are 30 nm$\leq$Re$\leq$75 nm and 120 nm$\leq$Rth$\leq$250 nm. When compensation is made by a single retardation film, 50 nm$\leq$Re$\leq$75 nm and 180 nm$\leq$Rth$\leq$250 nm are preferable. When compensation is made by two retardation films, 30 nm$\leq$Re$\leq$50 nm and 80 nm$\leq$Rth$\leq$140 nm are preferable. They correspond to a preferable embodiment from the standpoint of dependency of color shift and contrast upon viewing angles at the time of performing black display in the compensation film of the VA mode.

Desired optical characteristics of the film of the present invention can be realized by appropriately adjusting process conditions such as the copolymerizing ratio, the kinds and the addition amounts of the additives, the stretching magnification, the content of the residual volatile components on peeling, etc.

In the description, Re($\lambda$) and Rth($\lambda$) each indicate the in-plane retardation and the thickness direction retardation of the film at a wavelength $\lambda$. Re($\lambda$) is measured by applying a light having a wavelength of $\lambda$ nm in the normal direction of the film, using KOBRA-21ADH or WR (by Oji Scientific Instruments).

When the film tested is represented by a monoaxial or biaxial index ellipsoid, then its Rth($\lambda$) is computed according to the method mentioned below.

With the in-plane slow axis (judged by KOBRA 21ADH or WR) taken as the inclination axis (rotation axis) of the film (in case where the film has no slow axis, the rotation axis of the film may be in any in-plane direction of the film), Re($\lambda$) of the film is measured at 6 points in all thereof, from $-50°$ to $+50°$ relative to the normal direction of the film at intervals of $10°$, by applying a light having a wavelength of $\lambda$ nm from the inclined direction of the film. Based on the thus-determined retardation data of Re($\lambda$), the mean refractive index and the inputted film thickness, Rth($\lambda$) of the film is computed with KOBRA 21ADH or WR.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be computed according to the following formulae (1) and (2):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

[wherein Re($\theta$) means the retardation value of the film in the direction inclined by an angle $\theta$ from the normal direction; nx means the in-plane refractive index of the film in the slow axis direction; ny means the in-plane refractive index of the film in the direction vertical to nx; nz means the refractive index of the film vertical to nx and ny].

$$Rth=((nx+ny)/2-nz)\times d. \quad (2)$$

When the film to be tested could not be represented by a monoaxial or biaxial index ellipsoid, or that is, when the film does not have an optical axis, then its Rth($\lambda$) may be computed according to the method mentioned below.

With the in-plane slow axis (judged by KOBRA 21ADH or WR) taken as the inclination axis (rotation axis) of the film, Re($\lambda$) of the film is measured at 11 points in all thereof, from $-50°$ to $+50°$ relative to the normal direction of the film at intervals of $10°$, by applying a light having a wavelength of $\lambda$ nm from the inclined direction of the film. Based on the thus-determined retardation data of Re($\lambda$), the mean refractive index and the inputted film thickness, Rth($\lambda$) of the film is computed with KOBRA 21ADH or WR.

Further, when the film of the present invention is used as the protective film for the polarizing plate, it is preferable that an optical elasticity value is $0.5\times10^{-13}$ to $9.0\times10^{-13}$ [$cm^2$/dyn], and a moisture permeation value (value calculated by converting the film thickness to 80 µm) is preferably 180 to 435 [$g/cm^2 24$ h]. The optical elasticity value is more preferably $0.5\times10^{-13}$ to $7.0\times10^{13}$ [$cm^2$/dyn], further preferably $0.5\times10^{-13}$ to $5.0\times10^{13}$ [$cm^2$/dyn]. Meanwhile, the moisture permeation value (value obtained when the thickness of the film is converted to 80 µm) is more preferably 180 to 400 [$g/cm^2 24$ h], further preferably 180 to 350 [$g/cm^2 24$ h]. When the film of the present invention has the above characteristics and is used as the protective film for the polarizing plate, reduction in performances due to the influence of the temperature can be decreased.

[Polarizing Plates]

The polarizing plate of the present invention comprises at least the film of the invention and a polarizing element. Ordinarily, the polarizing plate comprises the polarizing element and two protective films disposed on its both sides. The film of the present invention can be used for both or one of these protective films. As another protective film, an ordinary cellulose acetate film or the like may be used. As the polarizing element, there are an iodine-based polarizing element, a dye-based polarizing element using a dichroic dye, and a polyene-based polarizing element. The iodine-based polarizing element and the dye-based polarizing element are generally produced by using polyvinyl alcohol-based films. When the film of the present invention is used as the protective film for the polarizing plate, the film is subjected to a surface treatment as mentioned later, and then the treated surface of the film is bonded to the polarizing element by using an adhesive. As the adhesive used, polyvinyl alcohol-based adhesives such as polyvinyl alcohol, polyvinyl butylal, etc., vinyl-based latexes such as butyl acrylate, gelatin, etc. are recited, for example. The polarizing plate is constituted by the polarizing element and the protective films protecting both of the surfaces thereof, and further a protective film is laminated on one surface of the polarizing plate, and a separation film is laminated on the opposite surface. The protective film and the separation film are used for protecting the polarizing plate at the times of the delivering the polarizing plate, inspecting the product, etc. In this case, the protective film is laminated to protect the surface of the polarizing plate, and used at one surface opposite to another at which the polarizing plate is to be bonded to a liquid crystal plate. Further, the separation film is used for covering an adhesive layer bonded to the liquid crystal plate, and used at a side of the surface at which the polarizing plate is to be bonded to the liquid crystal plate. It is preferable that the film of the present invention is bonded to the polarizing element, while the transmitting axis of the polarizing element is in conformity with the retardation phase axis of the film.

(Surface Treatment of Films)

In the present invention, the surface of the film is preferably treated to improve the adhesion between the polarizing element and the protective film. Any surface treating method may be used, so long as it can improve the adhesion. As a preferable surface treating method, a glow discharge treatment, an ultraviolet ray irradiation treatment, a corona treatment and a flame treatment are recited, for example. The glow discharge treatment recited here means a treatment with a so-called low temperature plasma occurring under a low gas pressure. In the present invention, plasma treatment under the atmospheric pressure is also preferred. Details of the glow discharge treatments other than the above are described in U.S. Pat. No. 3,462,335, U.S. Pat. No. 3,761,299, U.S. Pat. No. 4,072,769 and British Patent No. 891,469. Further, a method described in JP-A S59-556,430 is also used, in which after discharging is started, a discharge atmosphere gas composition is only a gas species generated in a container when a polyester support itself is treated with the discharging. Furthermore, a method described in JP-B S60-16614 is also used, in which when glow discharge treatment is to be performed in vacuum, discharging is effected in the state that the surface temperature of the film is set at 80° C. to 180° C.

Although a preferred range of the degree of the surface treatment differs depending upon the kind of the surface treatment, it is preferable that the surface treatment results in a contact angle between the treated surface of the protective film and pure water being less than 50°. The above contact angle is more preferably not less than 25° and less than 45°. When the contact angle between the surface of the protective film and pure water is in the above range, the adhesion strength between the protective film and the polarizing element becomes good.

(Adhesive)

When the polarizing element made of the polyvinyl alcohol and the surface-treated film of the present invention are bonded together, an adhesive containing a water-soluble polymer is preferably used. As the water-soluble polymer preferably used in the above adhesive, mention may be made of homopolymers or copolymers composed of, as constituent elements, ethylenic unsaturated monomers such as N-vinyl pyrrodidone, acrylic acid, methacrylic acid, maleic acid, β-hydroxyethyl acrylate, β-hydroxyethyl methacrylate, vinyl alcohol, methylvinyl ether, vinyl acetate, acrylamide, methacrylamide, diacetone acrylamide, vinylimidazole, etc., polyoxyethylene, polyoxypropylene, poly-2-methyloxazoline, methyl cellulose, hydroxyethyl cellulose, hydroxypropyl cellulose gelatin, etc. In the present invention, PVA and gelatin are preferred among them. The thickness of the adhesive layer is preferably 0.01 to 5 µm, more preferably 0.05 to 3 µm after drying.

(Antireflection Layer)

It is preferable to dispose a functional film such as an antireflection layer or the like on the protective film of the polarizing plate located on the opposite side of the liquid crystal cell. Particularly, the present invention favorably uses an antireflection layer composed of at least a light scattering layer and a layer of a low refractive index laminated on the protective film in this order or an antireflection layer composed of a medium refractive index layer, a high refractive index layer and a low refractive index layer laminated on the protecting layer in this order.

(Light Scattering Layer)

The light scattering layer is formed to afford upon the film a light scattering property based on surface scattering and/or interior scattering and a hard coat property to improve abrasion resistance of the film. Therefore, the light scattering layer is formed by incorporating a binder to provide the hard coat property, matting particles to provide the light scattering property, and if necessary an inorganic filler to increase the refractive index, prevent crosslinking shrinkage and raise the strength. The thickness of the light scattering layer is preferably 1 to 10 µm, and more preferably 1.2 to 6 µm from the standpoint of affording the hard coat property and from the standpoint of suppressing the occurrence of curling and progression of brittleness.

(Layers Other than the Antireflection Layer)

In addition, a hard coat layer, a front scattering layer, a primer layer, an antistatic layer, an undercoat layer, a protective layer, etc. may be provided.

(Hard Coat Layer)

The hard coat layer is provided on the surface of the support to afford a physical strength upon the protective layer on which the antireflection layer is provided. Particularly, the hard coat layer is preferable provided between the support and the above high refractive index layer. The hard coat layer is preferably formed by a crosslinking reaction or a polymerization reaction of a photocurable and/or thermosetting compound. As a curable functional group, a photopolymerizable functional group is preferable, and an organic metal compound containing a hydrolyzable functional group is preferably an organic alkoxy silyl compound.

(Antistatic Layer)

When the antistatic layer is provided, it is preferable that electroconductivity with a volume resistivity of not more than $10^{-8}$ ($\Omega cm^{-3}$) is imparted thereto. Although it is possible to impart the volume resistivity of not more than $10^{-8}$($\Omega cm^{-3}$)

by using a moisture-absorbable material, a water-soluble inorganic salt, a certain kind of a surface active agent, a cation polymer, an anion polymer, colloidal silica or the like, there are problems that dependency upon the temperature and the humidity is large and sufficient conductivity cannot be ensured at a low humidity. For this reason, a metal oxide is preferred as the material for the electroconductive layer.

[Liquid Crystal Display Device]

The film of the present invention, a retardation film made of that film and a polarizing plate using that film can be used in liquid crystal cells of various display modes and liquid crystal display devices. There are proposed various display modes such as TN(Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned) and HAN (Hybrid Aligned Nematic). Among them, the films of the present invention can be favorably used for the OCB mode and the VA mode.

EXAMPLES

In the following, the present invention will be explained more concretely by reciting examples. Materials, use amounts, ratios, treating contents, treating procedures, etc. shown in the following examples can be appropriately varied unless no deviation occurs from the purpose of the present invention. Therefore, the scope of the present invention is not limited to the specific examples shown below.

Among starting materials of the norbornene-based polymers of the present invention, 5-norbornene-2-yl acetate(bicyclo[2.2.1]hepto-5-ene-2-yl acetate) (NBOAc) is commercially available from Aldrich Corporation. The other norbornene-based compounds were produced as in the following Synthesis Examples.

Example 1

Synthesis Example 1-1

Synthesis of exo,exo-diphenyl norbornene

Norbornadiene (manufactured by Tokyo Chemical Industry Co., Ltd.) 53.9 g, 205.3 g of bromobenzene (manufactured by Wako Pure Chemical Industries, Ltd.), 160.4 g of sodium tetraphenyl borate (Aldrich Corporation), 400 ml of anisol (manufactured by Wako Pure Chemical Industries, Ltd.), and 3.7 g of tetrakistriphenyl phosphine palladium (Aldrich Corporation) were charged into a flask, and the mixture was stirred at 100° C. for 5 hours. The mixture obtained was filtered, and the filtrate was subjected to liquid separating extraction with ethyl acetate/water. The resultant was evaporated to remove volatile components such as ethyl acetate, bromobenzene, anisol, etc. The residue was subjected to a column chromatography (eluent: hexane), the eluted liquid was concentrated, the concentrate was dissolved in hexane, and the solution was recrystallized at −30° C., thereby obtaining 113 g of exo,exo-diphenylnorbornene (DiPhNB).

Synthesis Example 1-2

Synthesis of exo,exo-(phenyl)(pyrenyl)norbornene

Exo,exo-(phenyl)(pyrenyl)norbornene (PhPyrNB) was obtained by the same synthesis method, except that the equimolar amount of bromopyrene (manufactured by Wako Pure Chemical Industries, Ltd.) was charged instead of bromobenzene in Synthesis Example 1-1.

Synthesis Example 1-3

Synthesis of exo,exo-(phenyl)(1-naphthyl)norbornene

Exo,exo-(phenyl)(1-naphthyl)norbornene(PhNaphNB) was obtained by the same synthesis method, except that the equimolar amount of 1-bromonaphthalene (manufactured by Aldrich Corporation) was charged instead of bromobenzene in Synthesis Example 1-1.

Synthesis 1-4

Synthesis of exo,exo-dibenzoyl norbornene

Diphenyl iodonium tetrafluoro borate 20 g, 10 g of norbornadiene (Tokyo Chemical Industry Co., Ltd.), 50 mL of dimethyl formamide (manufactured by Wako Pure Chemical Industries, Ltd.) and 3 g of palladium acetate were placed, and the mixture was bubbled with carbon monoxide (manufactured by Sumitomo Seika Chemicals Co., Ltd.). To the resultant was added dropwisely a solution in which 20 g of sodium tetraphenyl borate (manufactured by Aldrich Corporation) was dissolved in 100 mL of dimethylformamide. After the addition of the solution was finished, the mixture was reacted at room temperature for 2 hours. Bubbling was effected with nitrogen to remove remaining carbon monoxide. The residue was subjected to a liquid separating extraction with ethyl acetate/water, and an organic layer was dried over magnesium sulfate, and then filtered. The filtrate was concentrated by evaporation, and a crude product obtained was subjected to a column chromatography. White crystals of exo,exo-dibenzoyl norbornene (Di(Bzy)NB) were obtained by recrystallizing the purified material.

Synthesis Example 1-5

Synthesis of exo,exo-(phenyl)(phenylethynyl)norbornene)

Diphenyl iodonium tetrafluoro borate 20 g, 10 g of norbornadiene, 50 ml, of dimethylformamide and 3 g of palladium acetate were placed. To the resultant was added dropwisely a solution in which 5.6 g of phenyl acetylene was dissolved in 10 mL of dimethylformamide. After the addition of the solution was finished, the mixture was reacted at room temperature for 2 hours. The resultant was quenched with a saturated aqueous solution of potassium fluoride, which was subjected to a liquid separating extraction with ethyl acetate/water, and an organic layer was dried over magnesium sulfate, and then filtered. The filtrate was concentrated by evaporation, and a crude product obtained was subjected to a column chromatography. White crystals of exo,exo-(phenyl)(phenylethyl) norbornene (Ph(PhEthynyl)NB) were obtained by recrystallizing the purified material.

Synthesis Example 1-6

Synthesis of 5-acetoxymethyl-2-norbornene

Dicyclopendadiene (manufactured by Wako Pure Chemical Industries, Ltd.) 1094 g, 1772 g of allyl acetate (manufactured by Wako Pure Chemical Industries, Ltd.) and 1 g of hydroquinon (manufactured by Wako Pure Chemical Industries, Ltd.) were placed into an autoclave, and a space was replaced by nitrogen. The mixture was stirred at an internal temperature of 180° C. in a sealed system for 9 hours (rotating speed=300 rpm). The reaction mixture was filtered, and volatile components were evaporated. The residue was subjected to precision distillation (reflux ratio=10/1, pressure=10 mmHg, trap temperature=89° C.), thereby obtaining 1550 g of colorless and transparent 5-acetoxymethyl-2-norbornene (NBCH$_2$OAc).

Synthesis Example 1-7

Synthesis of 5-butyloxymethyl-2-norbornene

5-Butyloxymethyl-2-norbornene (NBCH$_2$OCOC$_3$H$_7$) was obtained by the same operation as in Synthesis Example 1-6, except that allyl acetate in Synthesis Example 1-6 was replaced by ally butyrate (manufactured by Aldrich Corporation).

Synthesis Example 1-8

Purified toluene 1000 mL and 0.5 mol of exo,exo-DiPhNB synthesized in Synthesis Example 1-1 were placed into a reaction container. Then, 0.0125 mmol of allyl palladium chloride dimer (manufactured by Tokyo Chemical Industries, Ltd.) and 0.025 mmol of tricyclohexyl phosphine (manufactured by Strem Chemicals, Inc.) dissolved in 10 mL of toluene, 0.05 mmol of dimethyl anilinium-tetrakispentafluorophenyl borate (manufactured by Strem Chemicals, Inc.) dissolved in 5 mL of methylene chloride and 0.030 mmol of allyl tributyltin dissolved in 10 mL of toluene were placed into the reaction container. The mixture began to be heated, and stirred at 60° C. for one hour. Toluene was appropriately added, following increase in the viscosity of the reaction solution during the stirring. 1-Hexene ((manufactured by Wako Pure Chemical Industries, Ltd.), 0.01 mol, was added dropwisely, and the mixture was reacted further for one hour. The reaction solution obtained was poured into excess methanol, thereby precipitating Polymer P-1. The precipitate was collected, and washed with methanol. The polymer obtained was dried at 110° C. in vacuum for 6 hours.

The polymer obtained was dissolved in tetrahydrofuran, and the molecular weight was measured by the gel permeation chromatography. Results are shown in Table 1.

Synthesis Examples 1-9 to 1-11

P-2 to P-4 were obtained by the same synthesis procedure as in Synthesis Example 1-8, except that the exo,exo-DiPhNB synthesized in Synthesis Example 1-8 was replaced by exo, exo-PhPyrNB synthesized in Synthesis Example 1-2, exo, exo-Di(Bzy)NB synthesized in Synthesis Example 1-4, or exo,exo-Ph(PhEthynyl)NB synthesized in Synthesis Example 1-5, respectively. Results were shown in Table 1.

Synthesis Example 1-12

Purified toluene 100 mL and 0.5 mol of NBCH$_2$OAc were placed into a reaction container. Then, 0.05 mmol of allyl palladium chloride dimer (manufactured by Tokyo Chemical Industries, Ltd.) and 0.1 mmol of tricyclohexyl phosphine (manufactured by Strem Chemicals, Inc.) dissolved in 10 mL of toluene, 0.2 mmol of dimethyl anilinium-tetrakispentafluorophenyl borate (manufactured by Strem Chemicals, Inc.) dissolved in 5 mL of methylene chloride and 0.15 mmol allyl tributyltin (Aldrich Corporation) dissolved in 10 mL of toluene were placed into the reaction container. When the mixture began to be heated and reached 90° C., 0.05 mol of exo,exo-DiPhNB dissolved in 20 parts by mass of toluene was added dropwisely in 10 minutes. This mixture was reacted at 90 to 100° C. for 6 hours. During this step, toluene was appropriately added, following increase in the viscosity of the reaction solution. 1-Hexene (manufactured by Wako Pure Chemical Industries, Ltd.), 0.01 mol, was added dropwisely, and the mixture was further reacted for one hour. The reaction solution obtained was poured into excess methanol, thereby precipitating Polymer P-5. The precipitate was collected, and washed with methanol. The polymer obtained was dried at 110° C. in vacuum for 6 hours.

The polymer obtained was dissolved in tetrahydrofuran, and the molecular weight was measured by the gel permeation chromatography. The results were shown in Table 1.

When the polymer was dissolved in deuterium-substituted chloroform and $^1$HNMR measurement was effected, a relational expression of A:B=2(100–x):10x was satisfied with respect to "x" in a formula of Table 1, provided that an integration value of peaks appeared in 3.2 to 4.8 ppm (hydrogens of methylenes bonded to acetoxy groups) was taken as "A" and an integration value of peaks appeared in 7 to 8 ppm (hydrogens of phenyl groups) was taken as "B".

Synthesis Example 1-13

P-6 having a different copolymerization ratio was synthesized as in Synthesis Example 1-12, except that the amount of the exo, exo-DiPhNB was increased. The molecular weight and the x value were determined in the same manners. Results were shown in Table 1.

Synthesis Example 1-14

P-7 was synthesized as in Synthesis Example 1-12, except that NBCH$_2$OAc was replaced by NBCH$_2$OCOC$_3$H$_7$. The molecular weight and an x-value were determined in the same manners. Results were shown in Table 1.

Synthesis Example 1-15

P-8 was synthesized as in Synthesis Example 1-13, except that NBCH$_2$OAc charged in Synthesis Example 1-13 was replaced by NBOAc. The molecular weight was determined in the same manner. When the polymer was dissolved in deuterium-substituted chloroform and $^1$HNMR measurement was effected, a relational expression of C:D=(100–x):10x was satisfied, provided that an integration value of peaks appeared in 4.3 to 5.3 ppm (hydrogens bonded to carbons bonded to the acetoxy groups) was taken as "C" and an integration value of peaks appeared in 7 to 8 ppm (hydrogens of phenyl groups) was taken as "D". According to this, the x value was determined. The results were shown in Table 1.

Synthesis Examples 1-16 to 1-19

P-9 to P-12 were obtained by the same synthesis procedure as in Synthesis Example 1-13, except that the exo,exo-DiPhNB placed in Synthesis Example 1-13 was replaced by exo,exo-PhPyrNB, exo,exo-PhNaphNB, exo,exo-Di(Bzy)NB or exo,exo-Ph(PhEthynyl)NB, respectively. The molecular weight and the x value were determined as mentioned above based on a ratio between an integration value of hydrogens of methylenes bonded to acetoxy groups and an integration value of hydrogens of phenyl groups. The results are shown in Table 1.

Synthesis Example 1-20

Dicyclopendadiene (manufactured by Wako Pure Chemical Industries, Ltd.) 674.0 g, 508.0 g of styrene (manufactured by Wako Pure Chemical Industries, Ltd.) and 1 g of hydroquinon (manufactured by Wako Pure Chemical Industries, Ltd.) were placed into an autoclave, and a space was replaced by nitrogen. The mixture was stirred at an internal temperature of 180° C. in a sealed system for 8 hours (rotating speed=300 rpm). The reaction mixture was subjected to flash distillation to remove residual cyclopentadiene, styrene and polymers, thereby obtaining crude PhNB. This was subjected to precision distillation, thereby obtaining colorless and transparent endorich-PhNB. The peak purity of the colorless and transparent liquid obtained was measured by subjecting the liquid to a gas chromatography, which revealed that the purity was 98.5% and the endo/exo ratio was 78/22.

Synthesis Example 1-21

5-Hexyloxymethyl-2-norbornene (NBCH$_2$OCOC$_5$H$_{11}$) was obtained by the same procedure as in Synthesis Example 1-6, except that ally acetate in Synthesis Example 1-6 was replaced by allyl hexanoate (manufactured by Wako Pure Chemical Industries, Ltd.).

Synthesis Example 1-22

P-13 was obtained by the same operation as in Synthesis Example 1-16, except that NBCH$_2$OAc in Synthesis Example 1-16 was replaced by NBCH$_2$OCOC$_5$H$_{11}$. The molecular weight and the x value were determined as mentioned above based on a ratio between an integration value of hydrogens of methylenes bonded to hexyloxy groups and an integration value of hydrogens in an aromatic group region. The results are shown in Table 1.

Synthesis Example 1-23

A-1 was obtained by the same operation as in Synthesis Example 1-16, except that PhPyrNB in Synthesis Example 1-16 was replaced by endorich-PhNB. The molecular weight and the x value were determined as mentioned above based on a ratio between an integration value of hydrogens of methylenes bonded to acetoxy groups and an integration value of hydrogens in a phenyl group region. The number average molecular weight (Mn) and the weight average molecular weight (Mw) of the polymers are shown in Table 1. The Mn and Mw are those on polystyrene conversion by gel permeation chromatography using tetrahydrofuran as a solvent.

TABLE 1

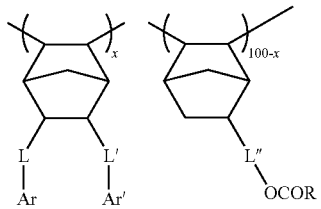

| | Polymer | L | L' | Ar | Ar' | X | L" | R | Mw | Mn |
|---|---|---|---|---|---|---|---|---|---|---|
| Synthesis Example 8 | P-1 | single bond | single bond | C$_6$H$_5$ | C$_6$H$_5$ | 100 | — | — | 424700 | 153000 |
| Synthesis Example 9 | P-2 | single bond | single bond | C$_6$H$_5$ | C$_{16}$H$_9$ | 100 | — | — | 454500 | 134200 |
| Synthesis Example 10 | P-3 | CO | CO | C$_6$H$_5$ | C$_6$H$_5$ | 100 | — | — | 234100 | 83400 |
| Synthesis Example 11 | P-4 | single bond | CC | C$_6$H$_5$ | C$_6$H$_5$ | 100 | — | — | 384300 | 124400 |
| Synthesis Example 12 | P-5 | single bond | single bond | C$_6$H$_5$ | C$_6$H$_5$ | 10 | CH$_2$ | CH$_3$ | 256700 | 84200 |
| Synthesis Example 13 | P-6 | single bond | single bond | C$_6$H$_5$ | C$_6$H$_5$ | 25 | CH$_2$ | CH$_3$ | 389400 | 123500 |
| Synthesis Example 14 | P-7 | single bond | single bond | C$_6$H$_5$ | C$_6$H$_5$ | 22 | CH$_2$ | C$_3$H$_7$ | 235600 | 73900 |
| Synthesis Example 15 | P-8 | single bond | single bond | C$_6$H$_5$ | C$_6$H$_5$ | 24 | single bond | CH$_3$ | 183500 | 63200 |
| Synthesis Example 16 | P-9 | single bond | single bond | C$_6$H$_5$ | C$_{16}$H$_9$ | 28 | CH$_2$ | CH$_3$ | 235600 | 74500 |
| Synthesis Example 17 | P-10 | single bond | single bond | C$_6$H$_5$ | C$_{10}$H$_7$ | 32 | CH$_2$ | CH$_3$ | 320900 | 102300 |
| Synthesis Example 18 | P-11 | CO | CO | C$_6$H$_5$ | C$_6$H$_5$ | 26 | CH$_2$ | CH$_3$ | 184500 | 56300 |
| Synthesis Example 19 | P-12 | single bond | CC | C$_6$H$_5$ | C$_6$H$_5$ | 24 | CH$_2$ | CH$_3$ | 445000 | 160300 |
| Synthesis Example 22 | P-13 | single bond | single bond | C$_6$H$_5$ | C$_{16}$H$_9$ | 30 | CH$_2$ | C$_5$H$_{11}$ | 390400 | 73400 |
| Synthesis Example 23 | A-1 | single bond | — | C$_6$H$_5$ | — | 29 | CH$_2$ | CH$_3$ | 423500 | 113400 |

In the above norbornene polymers, those of benzene, naphthalene and pyrene from which one hydrogen atom is removed are used as long wavelength components. A methylene chloride solution of each of these benzene, naphthalene and pyrene, 10 mg/L, was prepared, and measured by UV measuring instrument UV-2550 manufactured by Shimadzu Corporation. As to benzene, no local maximum absorption was detected in wavelengths of not less than 300 nm. On the other hand, as to naphthalene and pyrene, local maximum absorptions were detected in wavelengths of 300 nm to 400 nm. In pyrene, plural local maximum absorption wavelengths were detected. Principal local maximum absorption wavelengths and molar absorption coefficiences are shown in the below table.

TABLE 2

| | A local maximum absorption of wavelengths of 300 nm to 400 nm | A molar absorption coefficient [mol$^{-1}$dm$^3$cm$^{-1}$] |
|---|---|---|
| Benzene | Undetected | |
| Naphtalene | 320 nm | 180 |
| Pyrene | 320 nm | 19950 |
| Pyrene | 340 nm | 31600 |
| Pyrene | 370 nm | 320 |
| Pyrene | 380 nm | 130 |

Example 1-1

Production of Polymer Films and Measurements of Film Characteristics (Production of Films)

In 200 g of methylene chloride was dissolved 50 g of the polymer P-1 obtained above, which was filtered under pressure. A film was produced by flow-casting the obtained dope on a hydrophobic glass plate having a A3 size by using an applicator. The film was dried at 25° C. for 5 minutes in a sealed system, and subsequently dried at 40° C. for 10 minutes in an air blow dryer. The film was peeled from the glass plate, and pinched in a stainless frame. The resultant was dried at 100° C. for 30 minutes in the dryer, and at 133° C. for 30 minutes in the dryer. Thereby, a transparent film F-1 was obtained. Similarly, transparent films F-2 to F-13 and FA-1 were obtained from P-2 to P-13 and A-1.

(Stretching)

Each of the transparent films F-5 to F-13 and FA-1 was cut into a size of 5 cm long×5 cm wide. This was stretched at a temperature of 230° C. to 250° C. by using an automatic stretcher manufactured by Imoto Seisakujo Co., Ltd., thereby obtaining stretched films F-5' to F-13' and FA-1'. Stretching temperatures and stretched magnifications are as shown in Table 3.

(Measurements of Physical Properties)

Re values of the stretched films were measured over wavelengths of 450 nm to 750 nm as mentioned above. The thickness of the film was obtained by averaging thicknesses at arbitrary three points, which were measured by a digital micrometer. Re values at wavelengths 450 nm, 590 nm and 650 nm, which were obtained by converting the thickness as 80 μm, were taken as Re450, Re590 and Re630, respectively. As an index for representing a wavelength dispersion characteristic of Re, $\Delta Re = Re630 - Re450$ was calculated.

Evaluation results of Re590 and evaluation results of $\Delta Re = Re630 - Re450$ of the above produced films were summarized in Table 3.

TABLE 3

| Film | Stretching temperature | Stretched ratio | $Re_{590}$ [nm] | $\Delta Re$ [nm] | Remark |
|---|---|---|---|---|---|
| F-1 | — | — | 0.3 | 0.5 | Example |
| F-2 | — | — | −0.4 | 1.3 | Example |
| F-3 | — | — | −0.3 | 1.1 | Example |
| F-4 | — | — | −0.1 | 1.9 | Example |
| F-5 | — | — | 5.9 | 0.9 | Example |
| F-6 | — | — | 4.3 | 1.7 | Example |
| F-7 | — | — | 4.9 | 1.5 | Example |
| F-8 | — | — | 5.2 | 0.4 | Example |
| F-9 | — | — | 2.4 | 0.9 | Example |
| F-10 | — | — | 3.5 | 0.5 | Example |
| F-11 | — | — | 2.5 | 0.8 | Example |
| F-12 | — | — | 1.3 | 1.1 | Example |
| F-13 | — | — | 2.9 | 1.3 | Example |
| F-5' | 250° C. | 20% | 92.1 | 3.4 | Example |
| F-6' | 250° C. | 20% | 65.1 | 10.3 | Example |
| F-7' | 250° C. | 40% | 70.2 | 14.3 | Example |
| F-8' | 250° C. | 20% | 53.2 | 10.2 | Example |
| F-9' | 250° C. | 20% | 3.4 | 43.2 | Example |
| F-10' | 250° C. | 20% | 21.3 | 20.4 | Example |
| F-11' | 230° C. | 20% | 34.5 | 10.3 | Example |
| F-12' | 230° C. | 20% | 25.3 | 5.4 | Example |
| F-13' | 250° C. | 60% | −18.3 | 87.3 | Example |
| A-1 | — | — | 16.3 | 0.3 | Comparative Example |
| A-1' | 250° C. | 20% | 87.2 | −2.1 | Comparative Example |

As seen from the results in Table 3, the Re values of the films of the present invention have reverse wavelength dispersion characteristics. The reverse wavelength dispersion characteristics are exhibited to a higher degree in the case of the polymer films into which a long wavelength component such as naphthalene or pyrene was introduced. On the other hand, Films A-1 and A-1' as Comparative Examples described in WO/2004/049011 exhibit normal wavelength dispersion characteristics of which wavelength dispersion degree is low.

Example 1-2

Production and Evaluation of Polarizing Plates

The film F-6' produced above and a cellulose acylate film (manufactured by Fuji Photo Film Co., Ltd., Fuji TAC) were immersed in a 1.5 N aqueous solution of sodium hydroxide at 60° C. for 2 minutes. Then, after they were immersed in a 0.1 N aqueous solution of sulfuric acid for 30 seconds, they were passed through a water washing bath, thereby obtaining saponified F-6' and Fuji TAC.

A polarizing film was obtained by longitudinally stretching a 75 μm-thick polyvinyl alcohol film (manufactured by Kuraray Co., Ltd., 9X75RS) according to Example 1 of JP-A 2001-141926, while different peripheral velocities were given to two pairs of nipple rolls.

In order that a laminated structure of "the saponified F-6'/the polarizing film/the saponified Fuji TAC" might be obtained while the film-longitudinal direction being set at 45°, a polarizing plate Pol-1 was produced by bonding the polarizing film thus obtained, the saponified F-6' and the saponified Fuji TAC together by using a 3 mass % aqueous solution of polyvinyl alcohol (PVA) (manufactured by Kuraray Co., Ltd., PVA-117H) as an adhesive.

Example 1-3

Production and Evaluations of Liquid Crystal Display Devices

One of two polarizing plates in each of 26-inch and 40-inch liquid crystal display devices which employed a VA type liquid crystal cell (manufactured by Sharp Corporation) was peeled. The two polarizing plate were disposed, sandwiching a liquid crystal layer, and that one of the polarizing plates was located on a side of an observer. Then, the above polarizing plate Pol-1 was bonded in place of the above peeled one by using an adhesive. Thus, a liquid crystal display device was produced by arranging the polarizing plates such that the transmission axis of the polarizing plate on the observer side was orthogonal to that of the polarizing plate on a side of a back light. Color unevenness of the liquid crystal display devices thus obtained was observed. The liquid crystal display devices in which the polarizing plate Pol-1 according to the present invention was incorporated were so excellent, free from color unevenness.

Example 2

Among starting materials of the norbornene-based polymers of the present invention, 5-norbornene-2-yl acetate (NBOCOCH$_3$) and norbornene carboxylic acid methyl ester are commercially available from Aldrich Corporation and from Tokyo Chemical Industry Co., Ltd., respectively. The peak purity thereof was measured by gas chromatography, wherein the NBOCOCH$_3$ has the purity of 99.0% and endo/exo ratio of 78/22 and the NBCOOCH$_3$ has the purity of 98.5% and endo/exo ratio of 49/51. The other norbornene-based compounds were produced as in the following Synthesis Examples.

 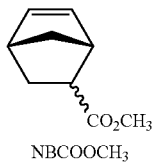

NBOCOCH$_3$    NBCOOCH$_3$

Synthesis Example 2-1

Synthesis of 5-acetoxy methyl-2-norbornene (NBCH$_2$OCOCH$_3$)

Dicyclopentadiene 1094 g (manufactured by Wako Pure Chemical Industries, Ltd.), 1772 g of allyl acetate (manufactured by Wako Pure Chemical Industries, Ltd.), 1 g of hydroquinone (manufactured by Wako Pure Chemical Industries, Ltd.) were placed into an autoclave, and a space was replaced by nitrogen. The mixture was stirred at an internal temperature of 180° C. in a sealed system for 9 hours (rotating speed=300 rpm). The reaction mixture was filtered, and volatile components were evaporated. The residue was subjected to precision distillation (length of column=120 cm, filler=Propak, reflux ratio=10/1, pressure=10 mmHg, trap temperature=89° C.), thereby obtaining colorless and transparent NBCH$_2$OCOCH$_3$. The peak purity thereof was measured by gas chromatography, and the NBCH$_2$OCOCH$_3$ has the purity of 99.9% and endo/exo ratio of 83/17.

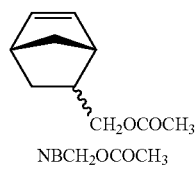

NBCH$_2$OCOCH$_3$

Synthesis Example 2-2

Synthesis of 5-buthyl oxymethyl-2-norbornene (NBCH$_2$OCOC$_3$H$_7$)

Colorless and transparent NBCH$_2$OCOC$_3$H$_7$ was obtained by the same synthesis procedures as in Synthesis Example 2-1, except that the allyl acetate was replaced by allyl butyrate (manufactured by Aldrich Corporation). The peak purity thereof was measured by gas chromatography, and the NBCH$_2$OCOC$_3$H$_7$ has the purity of 99.1% and endo/exo ratio of 80/20.

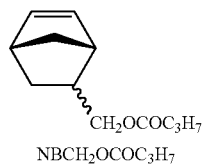

NBCH$_2$OCOC$_3$H$_7$

Synthesis Example 2-3

Synthesis of 5-hexyloxymethyl-2-norbornene (NBCH$_2$OCOC$_5$H$_{11}$)

Colorless and transparent NBCH$_2$OCOC$_5$H$_{11}$ was obtained by the same synthesis procedures as in Synthesis Example 2-1, except that the allyl acetate was replaced by allyl hexanoate (manufactured by Wako Pure Chemical Industries, Ltd.). The peak purity thereof was measured by gas chromatography, and the NBCH$_2$OCOC$_5$H$_{11}$ has the purity of 99.0% and endo/exo ratio of 79/21.

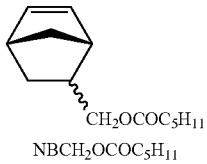

NBCH$_2$OCOC$_5$H$_{11}$

Synthesis Example 2-4

Synthesis of endorich-phyenyl norbornen (endorich-PhNB)

Cyclopentadiene 674.0 g (manufactured by Wako Pure Chemical Industries, Ltd.), 508.0 g of styrene (manufactured by Wako Pure Chemical Industries, Ltd.), 1 g of hydroquinone (manufactured by Wako Pure Chemical Industries, Ltd.) were placed into an autoclave, and a space was replaced by nitrogen. The mixture was stirred at an internal temperature of 180° C. in a sealed system for 8 hours (rotating speed=300 rpm). The reaction mixture was subjected to flash distillation to remove residual cyclopentadiene, styrene and polymers, thereby obtaining crude PhNB. This was subjected to precision distillation, thereby obtaining colorless and transparent endorich-PhNB. The peak purity of the colorless and transparent liquid obtained was measured by subjecting the liquid to a gas chromatography, which revealed that the purity was 98.5% and the endo/exo ratio was 78/22.

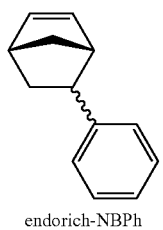

endorich-NBPh

Synthesis Example 2-5

Synthesis of exo-phenyl norbornen (exo-PhNB)

Iodobenzene 100 g (manufactured by Wako Pure Chemical Industries, Ltd.), 200 ml of norbornadiene (manufactured by Tokyo Chemical Industry Co., Ltd.), 200 ml of dimethylformamide, 225 ml of trimethylamine (manufactured by Wako Pure Chemical Industries, Ltd.), 48 ml of formic acid (the purity of 99%, manufactured by Wako Pure Chemical Industries, Ltd.), 34 g of dichlorobistriphenyl phosphine palladium (manufactured by Tokyo Chemical Industry Co., Ltd.) is placed, and the mixture was reacted at 50° C. for 3 hours. The resultant was subjected to a liquid separating extraction with ethyl acetate/water, and an organic layer was dried over magnesium sulfate, and then filtered. The filtrate was concentrated by evaporation, and a crude product obtained was subjected to a column chromatography and was distilled with hexane. The residual obtained by concentration was subjected to distillation under reduced pressure (3 mmHg/95%), thereby obtaining colorless and transparent exo-PhNB. The peak purity of the colorless and transparent liquid obtained was measured by subjecting the liquid to a gas chromatography, which revealed that the purity was 98.0% and the endo/exo ratio was 0/100.

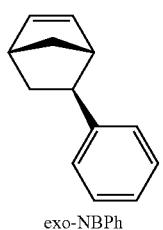

exo-NBPh

Synthesis Example 2-6

Synthesis of exo-1-naphthyl norbornene (exo-1-NaphNB)

1-iodonaphtalene 123.0 g (manufactured by Aldrich Corporation), 200 ml of dimethylformanide (manufactured by Tokyo Chemical Industry Co., Ltd.), 170 ml of norbornadiene (manufactured by Tokyo Chemical Industry Co., Ltd.), 270 ml of triethylamine (manufactured by Wako Pure Chemical Industries, Ltd.), 58 ml of formic acid (99%, (manufactured by Wako Pure Chemical Industries, Ltd.), 5.16 g of dichlorobistriphenyl phosphine palladium was placed and the mixture was reacted at 60° C. for 3 hours. The resultant was subjected to a liquid separating extraction with ethyl acetate/water, and an organic layer was dried over magnesium sulfate. This was filtered and then was subjected to evaporation. The residual was subjected to a column chromatography (The developing solvent is hexane), and the obtained solution was subjected to evaporation and was subjected to distillation under reduced pressure (3 mmHg/150 to 155° C.). The peak purity of the colorless and transparent liquid obtained was measured by subjecting the liquid to a gas chromatography, which revealed that the purity was 99.0% and the endo/exo ratio was 0/100.

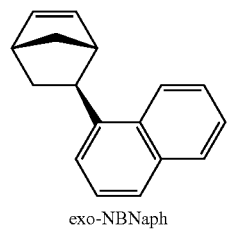

exo-NBNaph

Synthesis Example 2-7

Synthesis of exo-1-pyrenyl norbornene (exo-PyrNB)

1-boromopyrene 102.1 g (manufactured by Tokyo Chemical Industry Co., Ltd.), 180 ml of dimethylformamide (manufactured by Wako Pure Chemical Industries, Ltd.), 112 ml of norbornadiene (manufactured by Tokyo Chemical Industry Co., Ltd.), 180 ml of triethylamine (manufactured by Wako Pure Chemical Industries, Ltd.), 40 ml of formic acid (99%, manufactured by Wako Pure Chemical Industries, Ltd.), 3.0 g of dichlorobistriphenyl phosphine palladium (manufactured by Tokyo Chemical Industry Co., Ltd.) were placed, and the mixture was reacted at 80° C. for 4 hours. The resultant was subjected to a liquid separating extraction with ethyl acetate/water, and an organic layer was dried over magnesium sulfate. This was filtered and then was subjected to evaporation. The residual was subjected to a column chromatography (The developing solvent is hexane), and the fraction containing the object was concentrated and white crystals were obtained by recrystallizing it.

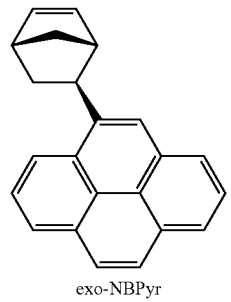

exo-NBPyr (Synthesis of Norbornene-Based Polymer)

Example 2-1

Synthesis of P-1

Purified toluene 45 ml, 36.0 g of $NBCH_2OCOC_5H_{11}$ and 7.9 g of exo-NaphNB was placed into a reaction container, and then the solution in which 12.4 mg of bisacetolacetonate palladium (Tokyo Chemical Industry Co., Ltd.) and 11.3 mg of trycyclohexylphoshine (manufactured by Strem Chemicals, Inc.) was reacted with 5 ml of toluene. Then, 61 mg of dimethylanilium tetrakispentafluorophenylborate (manufactured by Strem Chemicals, Inc.) which was dissolved into dichloromethane was added. This solution was stirred at 90° C. for 6 hours. White solid P-1 was obtained by precipitating the obtained solution into methanol. This was dried at 110° C. for 6 hours under vacuum. The P-1 was dissolved in deuterated methyl chloride and the $^1$HNMR thereof was measured. The copolymerization ratio was 73/27 from the comparison of the integral value of the peak (a hydrogen of a naphthyl group) which appears in the range of 6.5 to 8.5 ppm and the integral value of the peak (methylene hydrogen bound to a acetoxy group) which appears in the range of 3.0 to 4.5 ppm.

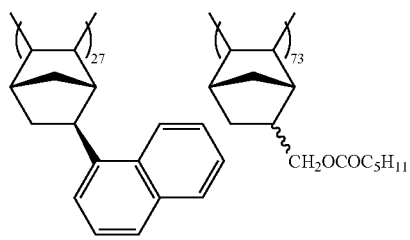

P-1

The obtained polymer was dissolved into tetrahydrofuran and the molecular weight thereof was measured by the gel permeation chromatography. The weight-average molecular weight (Mw) was 504800, the number-average molecular weight (Mn) was 104800.

Example 2-2

Synthesis of P-2

Purified toluene 200 ml, 3.12 g of NBCH$_2$OCOC$_5$H$_{11}$ and 11.8 g of exo-NaphNB was placed into a reaction container, and then the solution in which 6.6 mg of bisacetolacetonate palladium (Tokyo Chemical Industry Co., Ltd.) and 5.9 mg of trycyclohexylphosphine (manufactured by Strem Chemicals, Inc.) was reacted with 5 ml of toluene was added. Then 49 mg of dimethylanilium tetrakispentafluorophenylborate which was dissolved into dichloromethane (manufactured by Strem Chemicals, Inc.) was added. This solution was stirred at 90° C. for 6 hours. White solid P-2 was obtained by precipitating the obtained solution into methanol. This was dried at 110° C. for 6 hours under vacuum.

The $^1$HNMR was measured by the above-mentioned method, and the polymerization ratio was 36/64. The molecular weight based on GPC was measured, and the weight-average molecular weight (Mw) was 450300, the number-average molecular weight (Mn) was 103100.

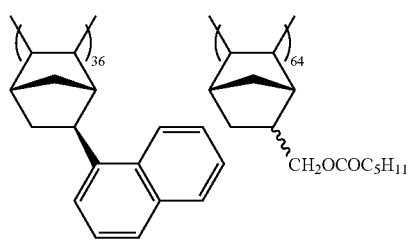

P-2

Example 2-3

Synthesis of P-3

P-3 was obtained by the same synthesis method as in Example 2-1, except that the NBCH$_2$OCOC$_5$H$_{11}$ was replaced by the equimolar amount of NBCH$_2$OCOC$_3$H$_7$. The polymerization ratio was 25/72. The molecular based on GPC was measured, and the weight-average molecular weight (Mw) was 473400, the number-average molecular weight (Mn) was 113400.

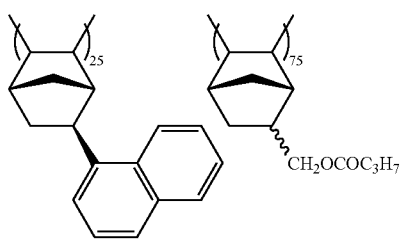

P-3

Example 2-4

Synthesis of P-4

P-4 was obtained by the same synthesis method as in Example 2-1, except that the NBCH$_2$OCOC$_5$H$_{11}$ was replaced by the equimolar amount of NBCH$_2$OCOCH$_3$. The polymerization ratio was 24/76. The molecular based on GPC was measured, and the weight-average molecular weight (Mw) was 54055, the number-average molecular weight (Mn) was 132400.

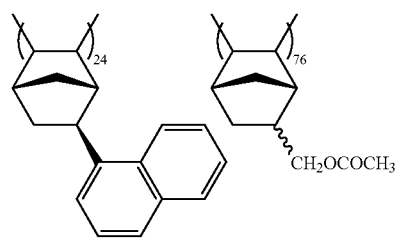

P-4

Example 2-5

Synthesis of P-5

P-5 was obtained by the same synthesis method as in Example 2-1, except that the NBCH$_2$OCOC$_5$H$_{11}$ was replaced by the equimolar amount of NBCOOCH$_3$. The polymerization ratio was 45/55. The molecular based on GPC was measured, and the weight-average molecular weight (Mw) was 200300, the number-average molecular weight (Mn) was 52100.

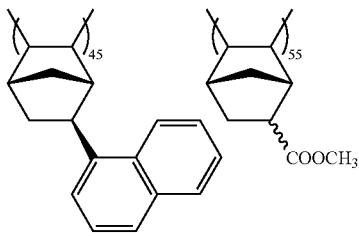

P-5

Example 2-6

Synthesis of P-6

P-6 was obtained by the same synthesis method as in Example 2-1, except that the NBOCOCH$_3$ was replaced by the equimolar amount of NBCH$_2$OCOC$_5$H$_{11}$. The polymerization ratio was 45/55. The molecular based on GPC was measured, and the weight-average molecular weight (Mw) was 227500, the number-average molecular weight (Mn) was 83100.

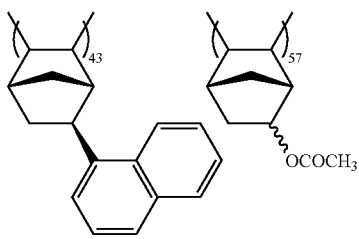

P-6

Example 2-7

Synthesis of P-7

Purified toluene 200 ml, 51.8 g of exo-NaPHNB and 11.2 g of 1-octene (manufactured by Wako Pure Chemical Industries, Ltd.) was placed into a reaction container, and then the solution in which 2 mg of bisacetolacetonate palladium (Tokyo Chemical Industry Co., Ltd.) and 2 mg of trycyclohexylphoshine (manufactured by Strem Chemicals, Inc.) was reacted with 5 ml of toluene was added. Then 30 mg of dimethylanilium tetrakispentafluorophenylborate (manufactured by Strem Chemicals, Inc.) which was dissolved into 5 ml of dichloromethane was added. This solution was stirred at 90° C. for 4 hours. White solid P-7 was obtained by precipitating the obtained solution into methanol. This was dried at 110° C. for 6 hours under vacuum. The molecular based on GPC was measured, and the weight-average molecular weight (Mw) was 340500, the number-average molecular weight (Mn) was 793000.

P-7

Example 2-8

Synthesis of P-8

Purified toluene 80 ml, 35.1 g of NBCH$_2$OCOC$_5$H$_{11}$ and 2.3 g of exo-PyrNB were placed into a reaction container, and then the solution in which 10.5 mg of bisacetolacetonate palladium (Tokyo Chemical Industry Co., Ltd.) and 9.5 mg of tricyclohexylphosphine (manufactured by Strem Chemicals, Inc.) were reacted with 5 ml of toluene was added. Then, 60 mg of dimethylanilium tetrakispentafluorophenylborate (manufactured by Strem Chemicals, Inc.) which was dissolved into 5 ml of dichloromethane was added. This solution was stirred at 90° C. for 6 hours. White solid P-8 was obtained by precipitating the obtained solution into methanol. This was dried at 110° C. for 6 hours under vacuum.

The $^1$HNMR was measured by the above-mentioned method, and the polymerization ratio was 95/5. The molecular based on GPC was measured, and the weight-average molecular weight (Mw) was 490200, the number-average molecular weight (Mn) was 110500.

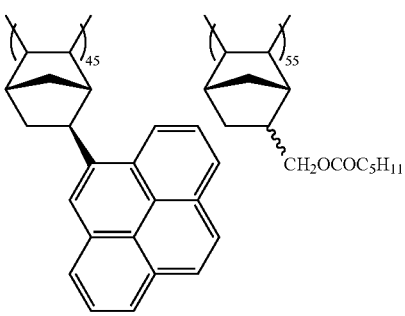

P-8

Example 2-9

Synthesis of P-9

Purified toluene 80 ml, 35.2 g of NBCH$_2$OCOC$_5$H$_{11}$ and 7.0 g of exo-PyrNB were placed into a reaction container, and then the solution in which 10.7 mg of bisacetolacetonate palladium (Tokyo Chemical Industry Co., Ltd.) and 10.3 mg of tricyclohexylphosphine were reacted with 5 ml of toluene was added. Then, 60 mg of dimethylanilium tetrakispentafluorophenylborate (manufactured by Strem Chemicals, Inc.) which was dissolved into 5 ml of dichloromethane was added. This solution was stirred at 90° C. for 6 hours. White solid P-9 was obtained by precipitating the obtained solution into methanol. This was dried at 110° C. for 6 hours under vacuum.

The $^1$HNMR was measured by the above-mentioned method, and the polymerization ratio was 84/16. The molecular based on GPC was measured, and the weight-average molecular weight (Mw) was 520300, the number-average molecular weight (Mn) was 122000.

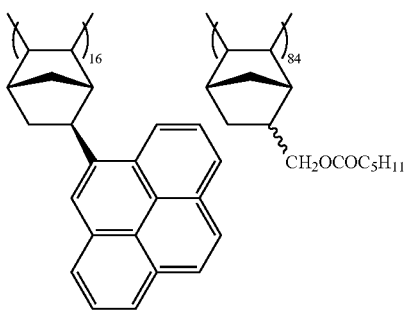

P-9

Example 2-10

Synthesis of P-10

P-10 was obtained by the same synthesis method as in Example 2-9, except that the NBCH$_2$OCOC$_5$H$_{11}$ was replaced by the equimolar amount of NBCH$_2$OCOCH$_3$. The polymerization ratio was 15/85. The molecular based on GPC was measured, and the weight-average molecular weight (Mw) was 493400, the number-average molecular weight (Mn) was 74500.

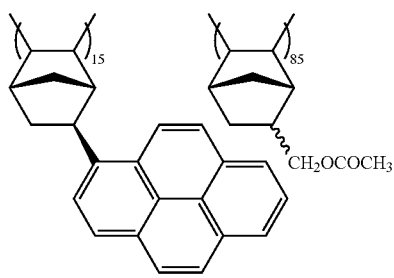

P-10

Comparative Example 2-1

Synthesis of PC-1

Purified toluene 60 ml, 26.9 g of NBCH$_2$OCOC$_5$H$_{11}$ and 6.9 g of endorich-NBPh were placed into a reaction container, and then the solution in which 7.1 mg of bisacetolacetonate palladium (Tokyo Chemical Industry Co., Ltd.) and 7.6 mg of tricyclohexylphosphine (manufactured by Strem Chemicals, Inc.) were reacted with 10 ml of toluene was added. Then 49 mg of dimethylanilium tetrakispentafluorophenylborate (manufactured by Strem Chemicals, Inc.) which was dissolved into 5 ml of dichloromethane was added. This solution was stirred at 90° C. for 6 hours. When the reaction was advanced, moderate amount of toluene was added since the viscosity of the solution increased. White solid was obtained by precipitating the obtained solution into methanol. This was dried at 110° C. for 6 hours under vacuum.

The $^1$HNMR was measured by the above-mentioned method, and the polymerization ratio was 27/73. The molecular based on GPC was measured, and the weight-average molecular weight (Mw) was 492500, the number-average molecular weight (Mn) was 108400.

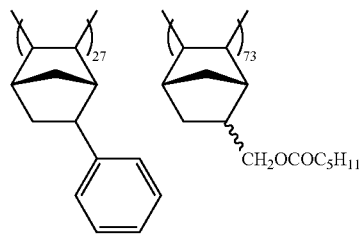

PC-1

Comparative Example 2-2

Synthesis of PC-2

PC-2 was obtained by the same synthesis method as in Comparative Example 2-1, except that the endorich-NBPh was replaced by the equimolar amount of exo-NBPh. The polymerization ratio was 27/73. The molecular based on GPC was measured, and the weight-average molecular weight (Mw) was 118900, the number-average molecular weight (Mn) was 523100.

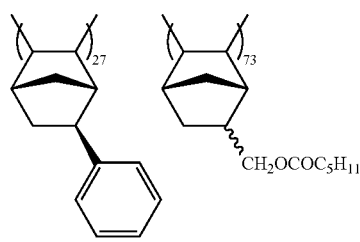

PC-2

In the above P-1 to P-10, PC-1 and PC-2, benzene, naphthalene and pyrene from which a hydrogen atom is removed are used as long wavelength components. A methylene chloride solution of each of these benzene, naphthalene and pyrene, 10 mg/L, was prepared, and measured by UV measuring instrument UV-2550 manufactured by Shimadzu Corporation at 25° C. As to benzene, no local maximum absorption was detected in wavelengths of not less than 300 nm. On the other hand, as to naphthalene and pyrene, local maximum absorptions were detected in wavelengths of 300 nm to 400 nm. In pyrene, 4 local maximum absorption wavelengths were detected. Principal local maximum absorption wavelengths and molar absorption coefficients are shown in the below table.

TABLE 4

|  | A local maximum absorption of wavelengths of 300 nm to 400 nm | A molar absorption coefficient [mol$^{-1}$dm$^3$cm$^{-1}$] |
| --- | --- | --- |
| Benzene | Undetected |  |
| Naphtalene | 320 nm | 180 |
| Pyrene | 320 nm | 19950 |
| Pyrene | 340 nm | 31600 |

TABLE 4-continued

| | A local maximum absorption of wavelengths of 300 nm to 400 nm | A molar absorption coefficient [mol$^{-1}$dm$^3$cm$^{-1}$] |
|---|---|---|
| Pyrene | 370 nm | 320 |
| Pyrene | 380 nm | 130 |

Example 2-11

(Production of Films and Measurement of Re)

The polymer P-1 30 g was dissolved in 120 g of methylene chloride, which was filtered under pressure. A film was produced by flow-casting the obtained dope on a hydrophobic glass plate having a A3 size by using an applicator. The film was dried at 25° C. for one minute in a sealed system, and subsequently dried at 40° C. for 15 minutes in an air blow dryer. The film was peeled from the glass plate, and pinched in a stainless frame. The resultant was dried at 100° C. for 30 minutes in the dryer, and at 133° C. for 30 minutes in the dryer. Thereby, a transparent film F-1 was obtained.

The thickness of the film was obtained by averaging thicknesses at arbitrary three points, which were measured by a digital micrometer. Re values were measured at wavelengths of 450 nm, 590 nm and 630 nm in the room which is at 25° C. and at 60% relative humidity as mentioned above. Conversion value at a thickness of 80 μm was obtained from this value and the actual measured film thickness. Re450, Re590 and Re630 which are Re values at wavelengths 450 nm, 590 nm and 630 nm of the unstretched film which were obtained by converting the thickness as 80 μm, respectively, and ΔRe=Re630−Re450 were shown in Table 5.

(Production of Stretched Film and Measurement of Re Value)

The transparent films F-1 was cut into a size of 5 cm long×5 cm wide. This was stretched by 60% at a temperature of 250° C. by using an automatic stretcher manufactured by Imoto Seisakujo Co., Ltd., thereby obtaining stretched films F-1'. The film thickness and Re values at wavelengths of 450 nm, 590 nm and 630 nm were measured, and the conversion value at a thickness of 80 μm was obtained from these values and the actual measured film thickness. Re450, Re590 and Re630 which are Re values at wavelengths 450 nm, 590 nm and 630 nm of the unstretched film which were obtained by converting the thickness as 80 μm, respectively, and ΔRe=Re630−Re450 were shown in Table 5.

Example 2-12 to 2-20

The polymer P-2 to P-10 was produced as the same manner as in Example 2-11, thereby obtaining film F-2 to F-10. The film thickness and Re values at wavelengths of 450 nm, 590 nm and 630 nm were measured, and Re450, Re590 and Re630 which are Re values at wavelengths 450 nm, 590 nm and 630 nm of the unstretched film which were obtained by converting the thickness as 80 μm, respectively, and ΔRe=Re630−Re450 were shown in Table 5.

Films F-2', 3', 4', 5', 6', 8', 9' and 10' were obtained by stretching the films F-2, 3, 4, 5, 6, 8, 9 and 10 at the stretching temperature and stretching ratio as shown in Table 5. The film thickness and Re values at wavelengths of 450 nm, 590 nm and 630 nm were measured, Re450, Re590 and Re630 which are Re values at wavelengths 450 nm, 590 nm and 630 nm of the stretched film which were obtained by converting the thickness as 80 μm, respectively, and ΔRe=Re630−Re450 were shown in Table 5.

Comparative Example 2-1 to 2-2

Polymers PC-1 and PC-2 were produced as the same manner as in Example 2-11, thereby obtaining films FC-1 and FC-2. The film thickness and Re values at wavelengths of 450 nm, 590 nm and 630 nm were measured, Re450, Re590 and Re630 which are Re values at wavelengths 450 nm, 590 nm and 630 nm of the unstretched film which were obtained by converting the thickness as 80 μm, respectively, and ΔRe=Re630−Re450 were shown in Table 5.

Films FC-1' and FC-2' were obtained by stretching the films FC-1 and FC-2 at the stretching temperature and stretching ratio as shown in Table 5. The film thickness and Re values at wavelengths of 450 nm, 590 nm and 630 nm were measured. Re450, Re590 and Re630 which are Re values at wavelengths 450 nm, 590 nm and 630 nm of the stretched film which were obtained by converting the thickness as 80 μm, respectively, and ΔRe=Re630−Re450 were shown in Table 5.

TABLE 5

| | Film | Stretching temperature | Stretched ratio | Re590 [nm] | ΔRe [nm] | Remark |
|---|---|---|---|---|---|---|
| Example 11 | F-1 | — | 0% | 5.1 | 0.2 | Example |
| | F-1' | 230° C. | 60% | 81.3 | 10.5 | Example |
| Example 12 | F-2 | — | 0% | 2.5 | 1.5 | Example |
| | F-2' | 240° C. | 60% | 16.5 | 19.1 | Example |
| Example 13 | F-3 | — | 0% | 2.9 | 0.3 | Example |
| | F-3' | 255° C. | 20% | 54.2 | 3.9 | Example |
| Example 14 | F-4 | — | 0% | 3.4 | 0.4 | Example |
| | F-4' | 250° C. | 20% | 42.1 | 3.4 | Example |
| Example 15 | F-5 | — | 0% | −0.8 | 0.2 | Example |
| | F-5' | 250° C. | 20% | −10.3 | 3.5 | Example |
| Example 16 | F-6 | — | 0% | −0.4 | 0.3 | Example |
| | F-6' | 250° C. | 20% | −9.6 | 2.8 | Example |
| Example 17 | F-7 | — | 0% | −3.5 | 0.4 | Example |
| Example 18 | F-8 | — | 0% | 2.9 | 0.2 | Example |
| | F-8' | 220° C. | 60% | 126.4 | 8.6 | Example |
| Example 19 | F-9 | — | 0% | 0.9 | 0.3 | Example |
| | F-9' | 240° C. | 60% | 41.4 | 47.8 | Example |
| Example 20 | F-10 | — | 0% | 0.5 | 0.2 | Example |
| | F-10' | 250° C. | 20% | 34.2 | 15.6 | Example |
| Comparative Example 1 | FC-1 | — | 0% | 2.2 | −0.1 | Comparative Example |
| | FC-1' | 240° C. | 20% | 87.2 | −2.2 | Comparative Example |
| | FC-1'' | 240° C. | 60% | 153.4 | −4.7 | Comparative Example |
| Comparative Example 2 | FC-2 | — | 0% | 1.2 | 0.1 | Comparative Example |
| | FC-2' | 240° C. | 60% | 124.1 | 2.4 | Comparative Example |

The norbornene films having benzene from which a hydrogen atom is removed such as Comparative Example 2-1 and 2-2 can change positive and negative of the wavelength dispersion characteristics of Re values by its endo/exo stereostructure, but the absolute values are small. On the other hand, it is found that the absolute values of the Re values of the norbornene films having naphthalene and pyrene from which a hydrogen atom is removed which having a local maximum absorption wavelength in 300 nm to 400 nm, are exhibited in a large degree.

Example 2-21

Production of Polarizing Plates

The film F-1 produced above and a cellulose acylate film (manufactured by Fuji Photo Film Co., Ltd., Fuji TAC) were immersed in a 1.5 N aqueous solution of sodium hydroxide at 60° C. for 2 minutes. Then, after they were immersed in a 0.1 N aqueous solution of sulfuric acid for 30 seconds, they were passed through a water washing bath, thereby obtaining saponified F-1' and Fuji TAC.

A polarizing film was obtained by longitudinally stretching a 75 μm-thick polyvinyl alcohol film (manufactured by Kuraray Co., Ltd., 9X75RS) according to Example 1 of JP-A 2001-141926, while different peripheral velocities were given to two pairs of nipple rolls.

In order that a laminated structure of "the saponified F-1'/the polarizing film/the saponified Fuji TAC" might be obtained while the film-longitudinal direction being set at 45°, a polarizing plate Pol-1 was produced by bonding the polarizing film thus obtained, the saponified F-1' and the saponified Fuji TAC together by using a 3 mass % aqueous solution of polyvinyl alcohol (PVA)(manufactured by Kuraray Co., Ltd., PVA-117H) as an adhesive.

Example 2-22

Production and Evaluations of Liquid Crystal Display Devices

One of two polarizing plates in each of 26-inch and 40-inch liquid crystal display devices which employed a VA type liquid crystal cell (manufactured by Sharp Corporation) was peeled. The two polarizing plate were disposed, sandwiching a liquid crystal layer, and that one of the polarizing plates was located on a side of an observer. Then, the above polarizing plate Pol-1 was bonded in place of the above peeled one by using an adhesive. Thus, a liquid crystal display device was produced by arranging the polarizing plates such that the transmission axis of the polarizing plate on the observer side was orthogonal to that of the polarizing plate on a side of a back light. Color unevenness of the liquid crystal display devices thus obtained was observed. The liquid crystal display devices in which the polarizing plate Pol-1 according to the present invention was incorporated were so excellent, free from color unevenness.

The present disclosure relates to the subject matter contained in Japanese Patent Application No. 207151/2006 filed on Jul. 28, 2006 and Japanese Patent Application No. 207152/2006 filed on Jul. 28, 2006, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A norbornene-based polymer comprising at least one repeating unit represented by the following formula (I):

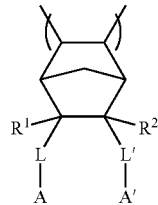

wherein $R^1$ and $R^2$ each represent a hydrogen atom, an alkyl group which may possess a substituent group or an aryl group which may possess a substituent group, L and L' each represent a bivalent linking group or a single bond, and A and A' each represent an aromatic group.

2. The norbornene-based polymer according to claim 1, wherein the L and the L' each represent a single bond, a carbonyl group or an acetylene group.

3. The norbornene-based polymer according to claim 1, wherein the A and/or the A' is an aromatic compound from which one hydrogen atom is removed, the one hydrogen atom-removed aromatic compound having a local maximum absorption wavelength in 270 nm to 400 nm and a molar absorption coefficient of 10 to 100,000 $mol^{-1}$ $dm^3$ $cm^{-1}$ at the local maximum absorption wavelength.

4. The norbornene-based polymer according to claim 3, wherein the A and/or the A' is 2-ring to 4-ring fused aromatic compounds from which one hydrogen atom is removed.

5. The norbornene-based polymer according to claim 1, wherein each of the L-A and the L'-A' is of an exo bond.

6. The norbornene-based polymer according to claim 1, which further comprises at least one repeating unit represented by the following formula (II):

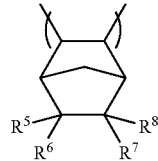

wherein $R^5$, $R^6$, $R^7$ and $R^8$ each represent a hydrogen atom, an alkyl group which may possess a substituent group, an aryl group which may possess a substituent group or -L"-O—CO—$R^9$ in which L" is a bivalent linking group or a single bond and $R^9$ is an alkyl group, and at least one of $R^5$, $R^6$, $R^7$ and $R^8$ is -L"-O—CO—$R^9$.

7. The norbornene-based polymer according to claim 6, wherein three of the $R^5$, the $R^6$, the $R^7$ and the $R^8$ each represent a hydrogen atom or an alkyl group which may have a substituent group.

8. The norbornene-based polymer according to claim 6, wherein the L" is a single bond or an alkylene group.

9. The norbornene-based polymer according to claim 6, wherein the $R^9$ is an alkyl group having 1 to 5 carbon atoms.

10. The norbornene-based polymer according to claim 6, which consists only of the repeating unit represented by the formula (I) and the repeating unit represented by the formula (II).

11. The norbornene-based polymer according to claim 1, wherein a polymerization compounding ratio of the repeating unit represented by the formula (I) is more than 0% and less than 80%.

12. A norbornene-based polymer comprising at least one repeating unit derived from a norbornene-based compound having at least one substituent group containing an aromatic compound from which a hydrogen atom is removed, wherein the aromatic compound from which a hydrogen atom is removed has a local maximum absorption wavelength in 300 nm to 400 nm and a molar absorption coefficient of 10 to 100,000 $mol^{-1}$ $dm^3$ $cm^{-1}$ at the local maximum absorption wavelength, wherein the norbornene-based polymer is an addition polymer of a norbornene-based compound.

13. The norbornene-based polymer according to claim 12, wherein the repeating unit derived from a norbornene-based compound is represented by the following formula (I-I):

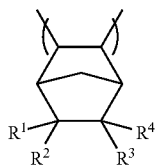

wherein $R^1$, $R^2$, $R^3$ and $R^4$ each represent a hydrogen atom, an alkyl group which may possess a substituent group, an aryl group which may possess a substituent group or a substituent group containing an aromatic compound from which a hydrogen atom is removed having a local maximum absorption wavelength in 300 nm to 400 nm and a molar absorption coefficient of 10 to 100,000 $mol^{-1}$ $dm^3$ $cm^{-1}$ at the local maximum absorption wavelength, and at least one of the $R^1$, the $R^2$, the $R^3$ and the $R^4$ is the above substituent group containing the compound from which a hydrogen atom is removed.

14. The norbornene-based polymer according to claim 13, wherein among the $R^1$, the $R^2$, the $R^3$ and the $R^4$, a substituent group other than the substituent group containing the compound from which a hydrogen atom is removed each represent a hydrogen atom or an alkyl group.

15. The norbornene-based polymer according to claim 13, wherein one or two of the $R^1$, the $R^2$, the $R^3$ and the $R^4$ represent the substituent group containing the compound from which a hydrogen atom is removed.

16. The norbornene-based polymer according to claim 12, wherein the compound from which a hydrogen atom is removed is bonded to the norbornene-based compound through an exo-bond.

17. The norbornene-based polymer according to claim 12, wherein the aromatic compound having a local maximum absorption wavelength in 300 nm to 400 nm and a molar absorption coefficient of 10 to 100,000 $mol^{-1}$ $dm^3$ $cm^{-1}$ at the local maximum absorption wavelength is a 2-ring to 4-ring fused aromatic compound.

18. The norbornene-based polymer according to claim 12, which further comprises at least one repeating unit represented by the following formula (II):

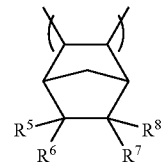

wherein $R^5$, $R^6$, $R^7$ and $R^8$ each represent a hydrogen atom, an alkyl group which may possess a substituent group, an aryl group which may possess a substituent group or -L"-O—CO—$R^9$ in which L" is a bivalent linking group or a single bond and $R^9$ is an alkyl group, and at least one of the $R^5$, the $R^6$, the $R^7$ and the $R^8$ is -L"O—CO—$R^9$.

19. The norbornene-based polymer according to claim 18, wherein the L" is a single bond or an alkylene group having 1 to 10 carbon atoms, and $R^9$ is an alkyl group having 1 to 10 carbon atoms.

20. The norbornene-based polymer according to claim 18, wherein $R^9$ is an alkyl group having 1 to 5 carbon atoms.

21. The norbornene-based polymer according to claim 13, wherein a polymerization compounding ratio of the repeating unit represented by the formula (I-I) is 3% to 50%.

22. The norbornene-based polymer according to claim 18, which consists only of the repeating unit represented by the formula (I-I) and the repeating unit represented by the formula (II).

23. A film comprising the norbornene-based polymer according to claim 1.

24. The film according to claim 23, which satisfies 10 nm≦ΔRe≦100 nm, a difference ΔRe=Re630−Re450 in which Re450 and Re630 are in-plane retardation values at wavelengths 450 nm and 630 nm, respectively.

25. The film according to claim 23, wherein an in-plane retardation value Re590 satisfies 30 nm≦Re590≦200 nm in which Re590 is an in-plane retardation value at a wavelength of 590 nm.

26. A polarizing plate comprising a polarizing film and the film according to claim 23.

27. A liquid crystal display device comprising the polarizing plate according to claim 26.

* * * * *